US008514914B2

(12) United States Patent
Yokoo et al.

(10) Patent No.: US 8,514,914 B2
(45) Date of Patent: Aug. 20, 2013

(54) IQ IMBALANCE CORRECTION METHOD IN A WIRELESS COMMUNICATION DEVICE INCLUDING A QUADRATURE MODULATION/DEMODULATION FUNCTION

(75) Inventors: Kaoru Yokoo, Kawasaki (JP); Kazuo Nagatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 119 days.

(21) Appl. No.: 13/049,046

(22) Filed: Mar. 16, 2011

(65) Prior Publication Data

US 2011/0228826 A1  Sep. 22, 2011

(30) Foreign Application Priority Data

Mar. 19, 2010  (JP) ................................. 2010-065034

(51) Int. Cl.
*H04B 1/38* (2006.01)
(52) U.S. Cl.
USPC ........... 375/219; 375/224; 375/226; 375/228; 375/260; 375/267; 375/296; 375/299; 375/346; 375/347; 455/67.11; 455/67.13; 455/67.14; 455/115.1; 455/115.2; 455/115.3; 455/115.4; 455/226.1; 455/296
(58) Field of Classification Search
CPC .............. H04L 27/3863; H04L 27/364; H04L 2027/0018; H04L 2027/0024; H03D 3/009; H04B 1/525
USPC ................. 375/219, 224, 228, 260, 267, 296, 375/299, 346, 347, 226; 455/67.11, 67.13, 455/67.14, 115.1, 115.2, 115.3, 115.4, 226.1, 455/296
See application file for complete search history.

(56) References Cited

U.S. PATENT DOCUMENTS

| 7,885,360 | B2  |   | 2/2011  | Tanabe et al. |
|---|---|---|---|---|
| 7,957,480 | B2 | * | 6/2011  | Egashira et al. ............... 375/260 |
| 2003/0169824 | A1 | * | 9/2003  | Chayat .......................... 375/260 |
| 2005/0152482 | A1 |   | 7/2005  | Tubbax et al. |
| 2008/0159442 | A1 | * | 7/2008  | Tanabe et al. .................. 375/324 |
| 2009/0274038 | A1 | * | 11/2009 | Takeuchi et al. ............... 370/210 |
| 2011/0135036 | A1 |   | 6/2011  | Andgart et al. |

FOREIGN PATENT DOCUMENTS

| CN | 101610230 A | 12/2009 |
|---|---|---|
| JP | 2005-527152 | 9/2005 |
| JP | 2007-60106  | 3/2007 |

(Continued)

OTHER PUBLICATIONS

Debaillie et al. "Calibration Method Enabling Low-Cost SDR", May 19, 2008, ICC 2008, pp. 4899-4903.*

(Continued)

*Primary Examiner* — Sophia Vlahos
(74) *Attorney, Agent, or Firm* — Katten Muchin Rosenman LLP

(57) ABSTRACT

An IQ imbalance correction method includes transmitting a plurality of pairs of RF training signals in installments by pairing RF training signals symmetric with respect to a center frequency on a frequency axis; setting a reception local frequency to change to a frequency that is suitable to receive, via an internal path, each of the plurality of pairs of RF training signals transmitted in installments, and suitable to convert the each of the plurality of pairs of RF training signals into IF training signals; and performing quadrature demodulation on the IF training signals, respectively, in a digital circuit area to generate BB training signals.

12 Claims, 25 Drawing Sheets

(56) References Cited

FOREIGN PATENT DOCUMENTS

| | | |
|---|---|---|
| JP | 2008-167057 | 7/2008 |
| JP | 2008-263585 | 10/2008 |
| WO | 03/101064 | 12/2003 |
| WO | 2010/000297 | 1/2010 |

OTHER PUBLICATIONS

European Search Report dated Aug. 23, 2011, from corresponding European Application No. 11 15 8728.

Yasuhiko Tanabe, et al. "A study on IQ Imbalance Correction Scheme for MIMO-OFDM Systems" IEICE Technical Report, RCS2006-272, Feb. 28, 2007.

Hiroyuki Kamata, et al. "Effects of IQ Imbalance and Effective Compensation Scheme on the MIMO-OFDM Communication System" Technical Report of IEICE, WBS2004-57, Feb. 23, 2005.

First Office Action dated Apr. 3, 2013 and the Search Report attached thereto, with English translations, from the corresponding Chinese Application No. 201110066902.1.

\* cited by examiner

FIG. 14
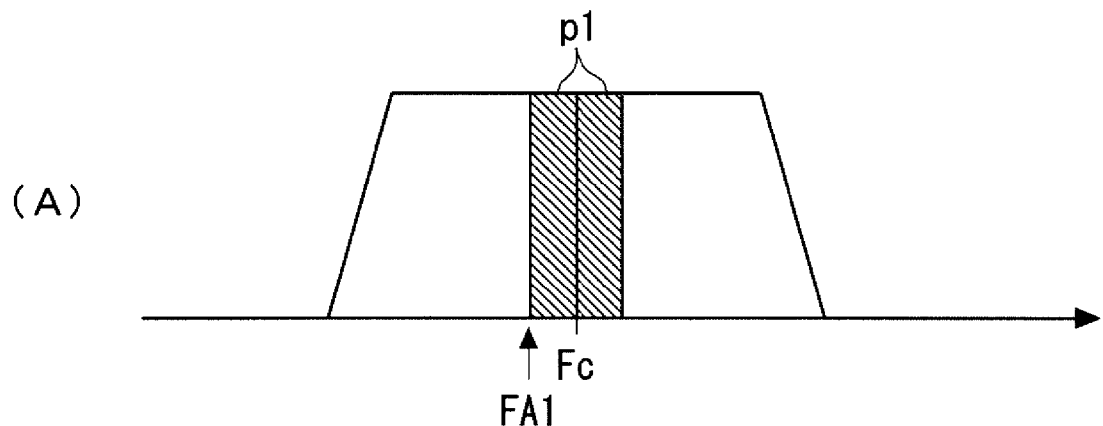
(A)
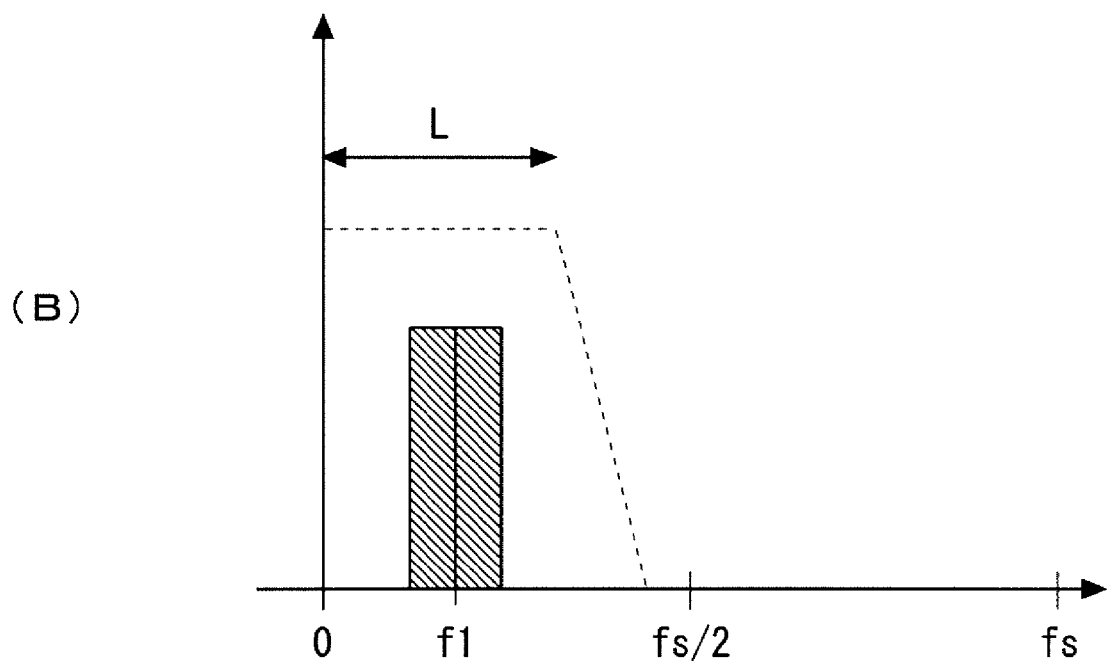
(B)

FIG. 15
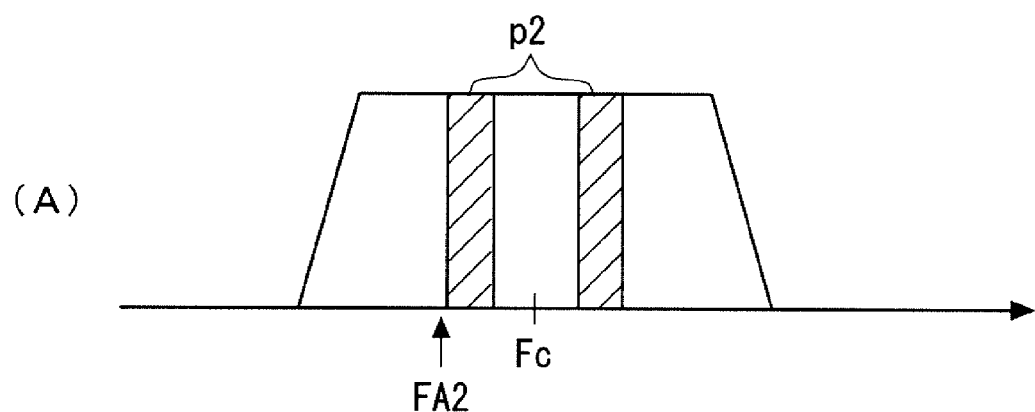
(A)
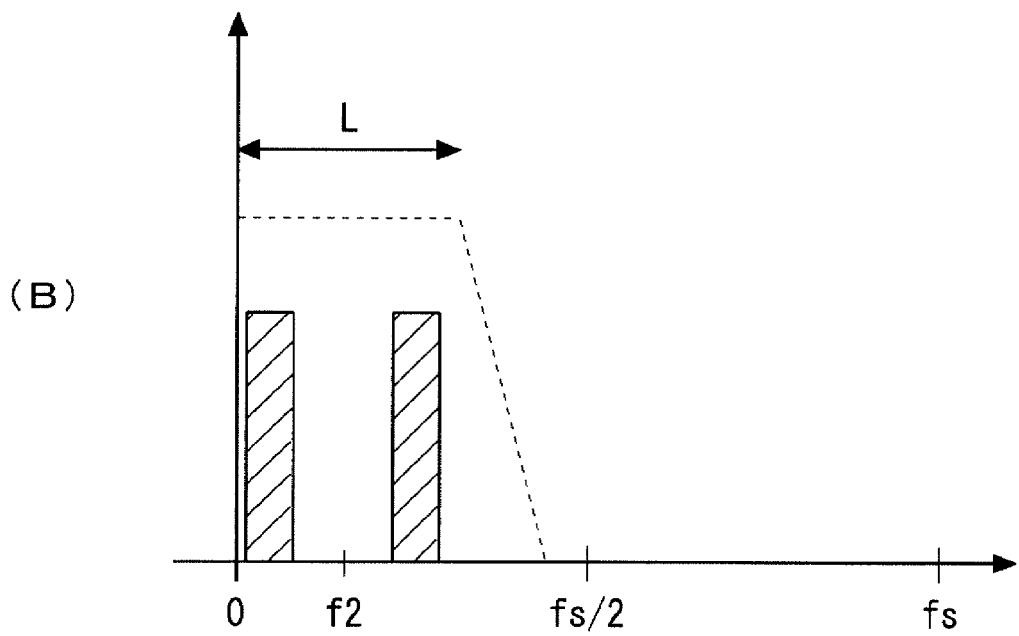
(B)

FIG. 17
(A) 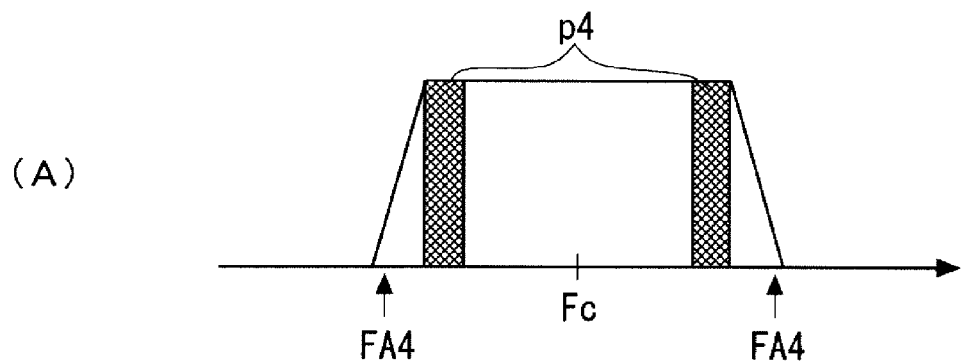
(B) 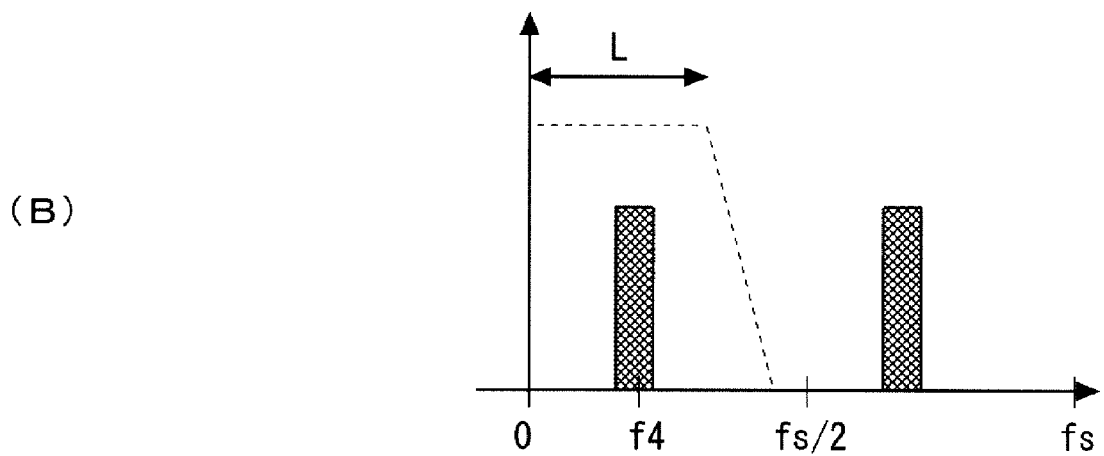
(C) 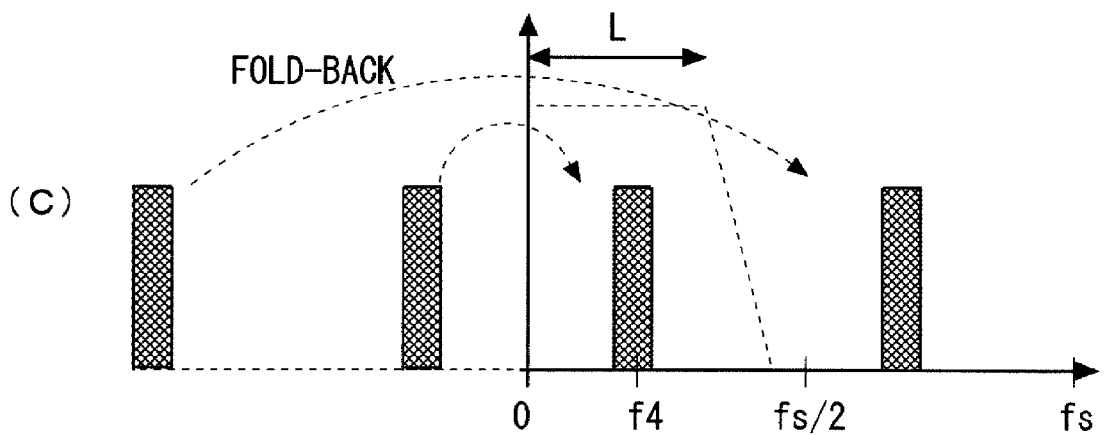

FIG. 19
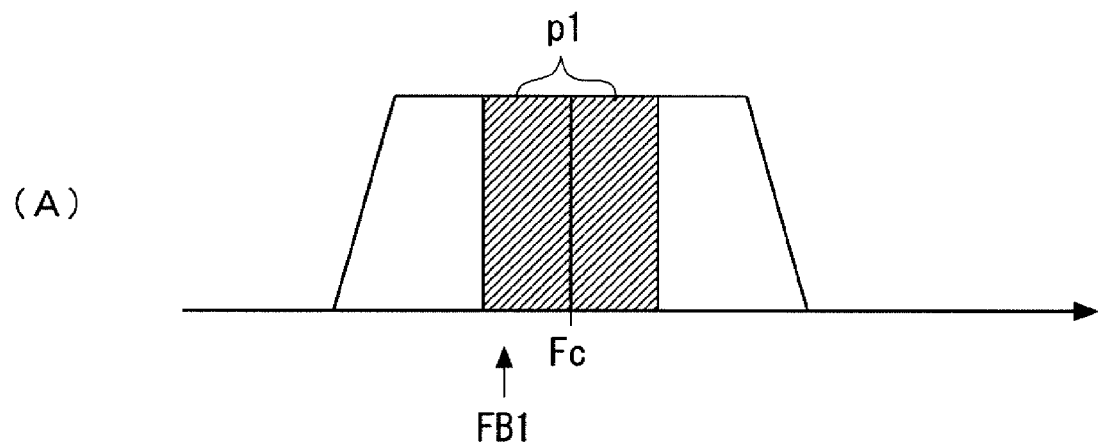
(A)
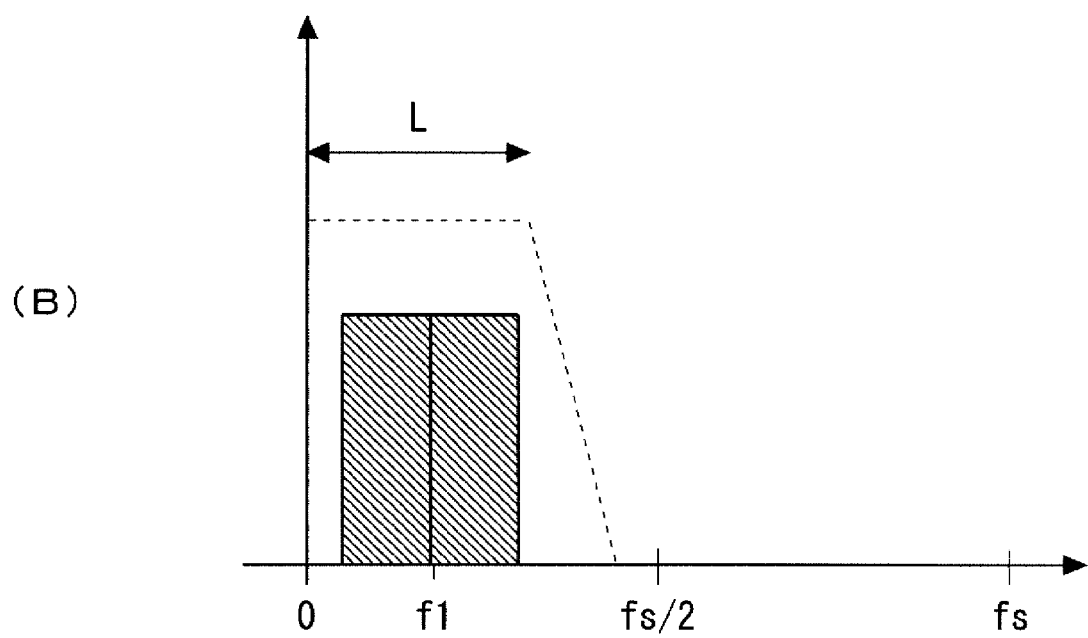
(B)

FIG. 21
(A) 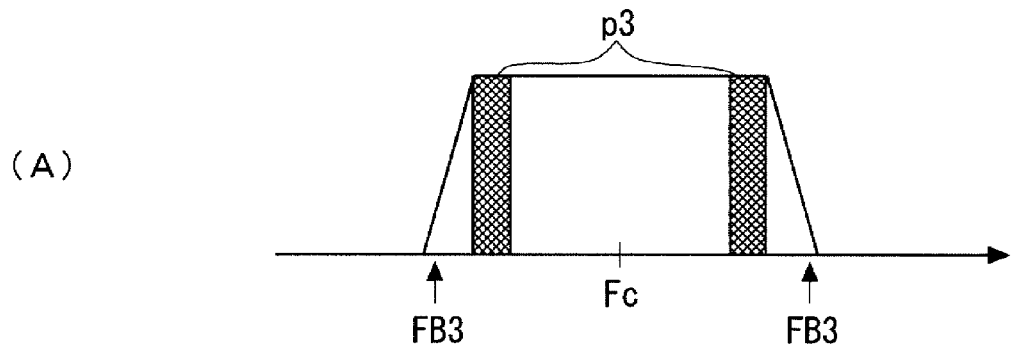
(B) 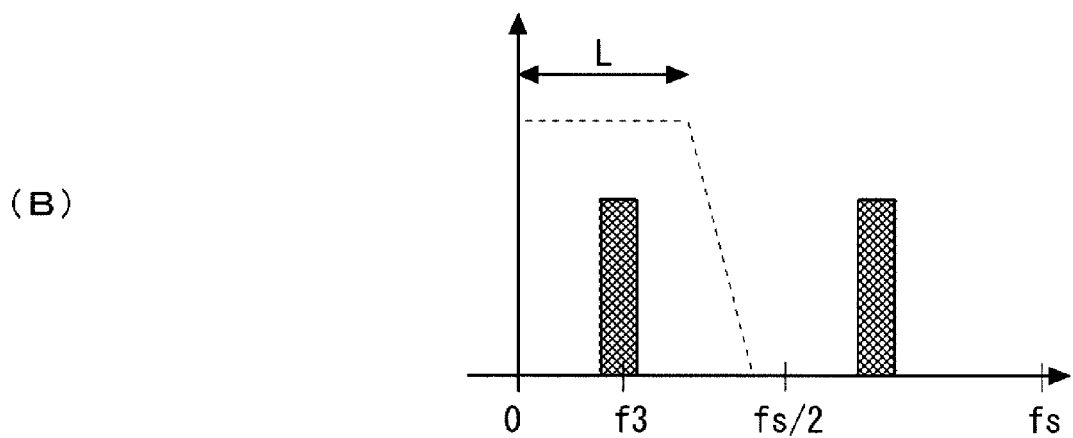
(C) 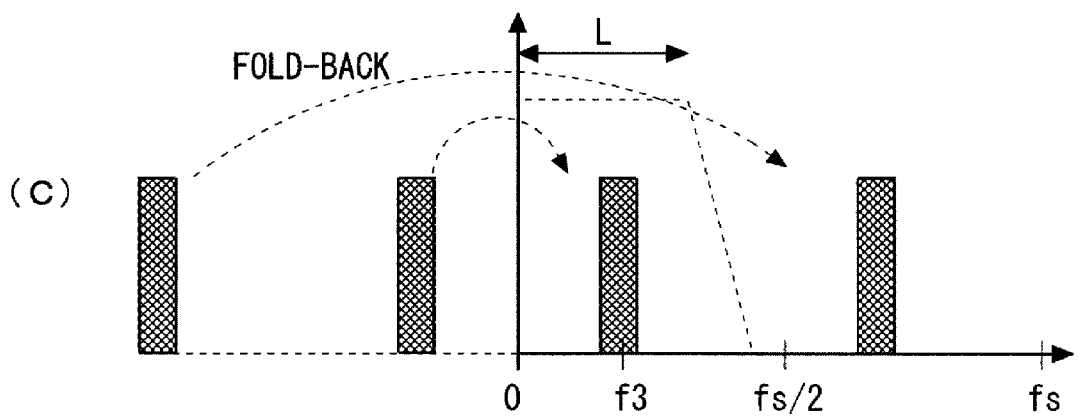

FIG. 23
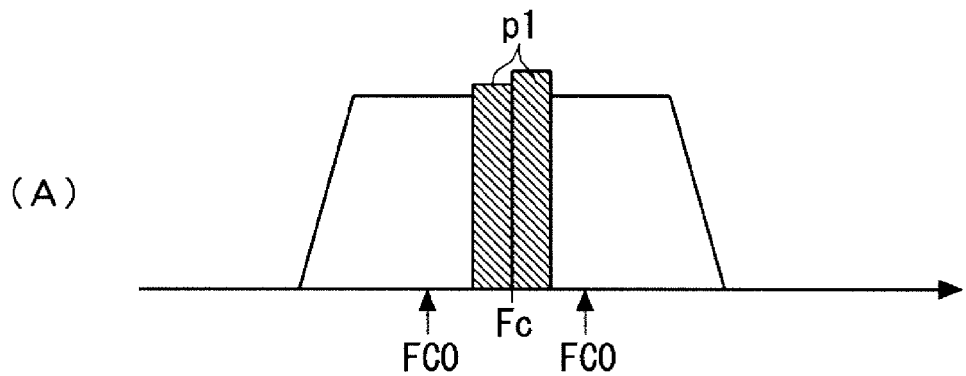
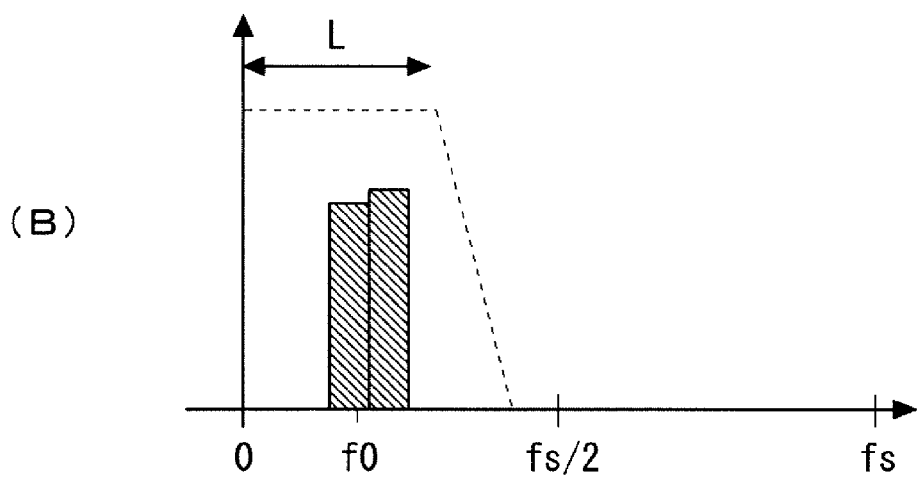
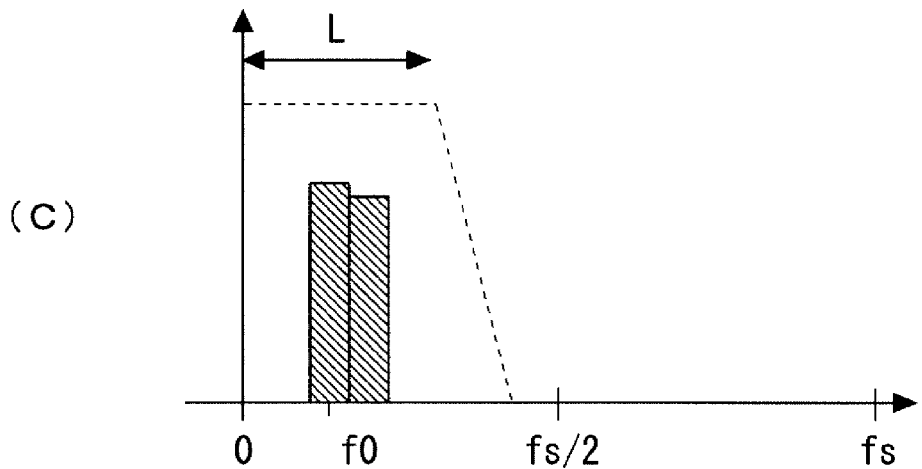

FIG. 24
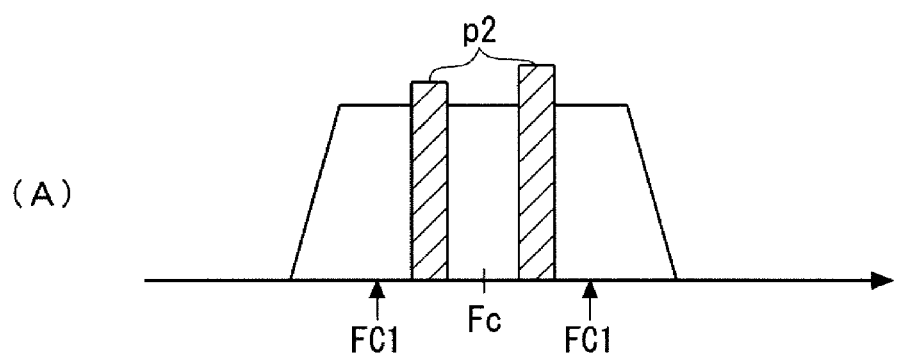
(A)
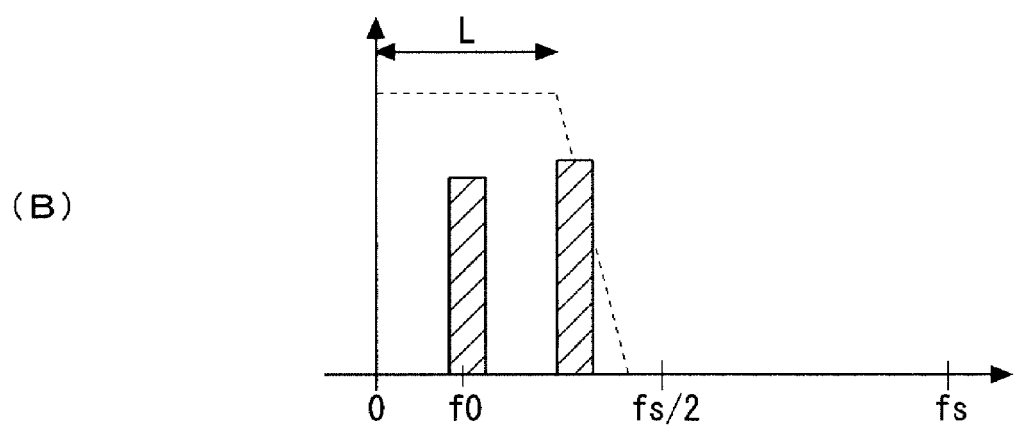
(B)
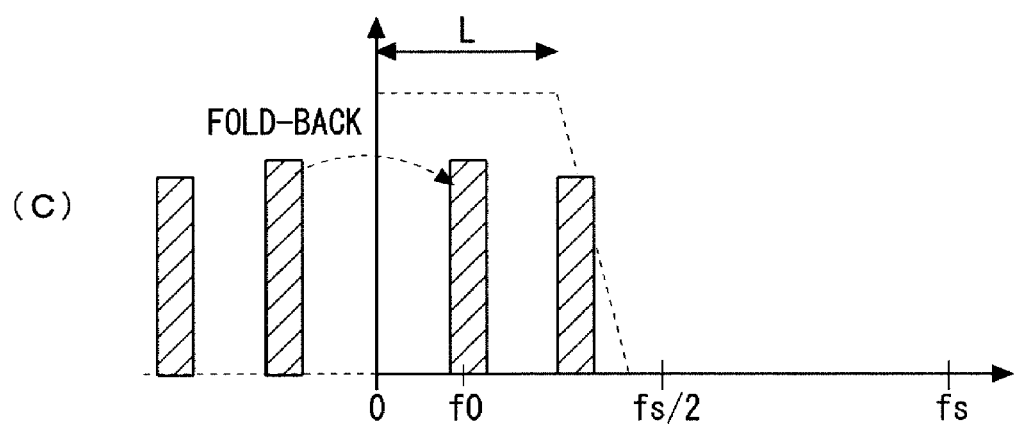
(C)

FIG. 25
(A)
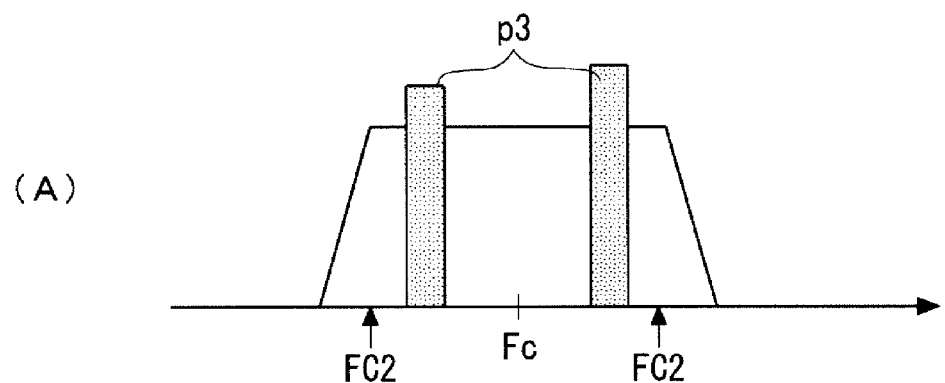
(B)
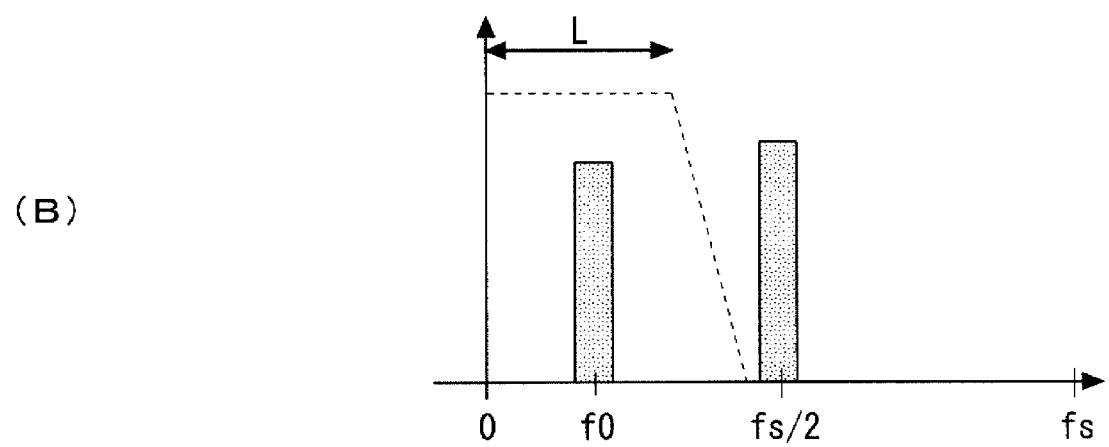
(C)
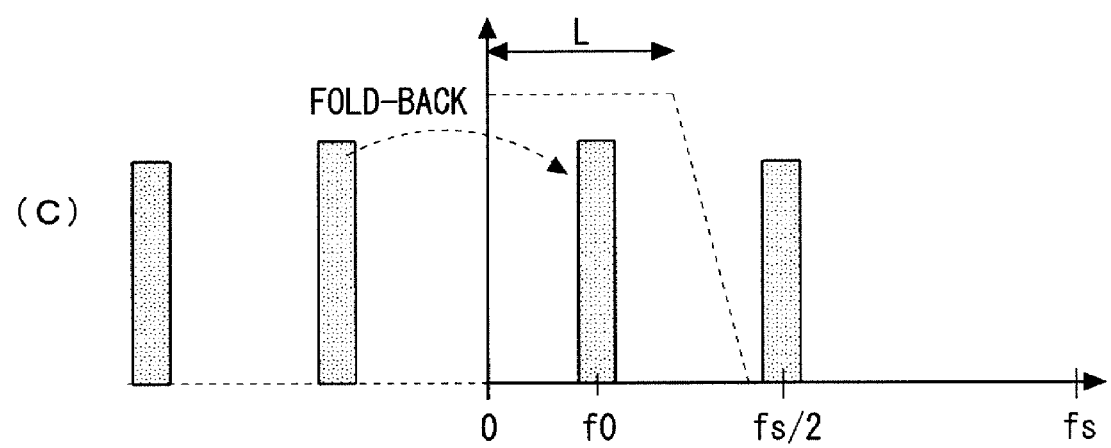

FIG. 26
(A) 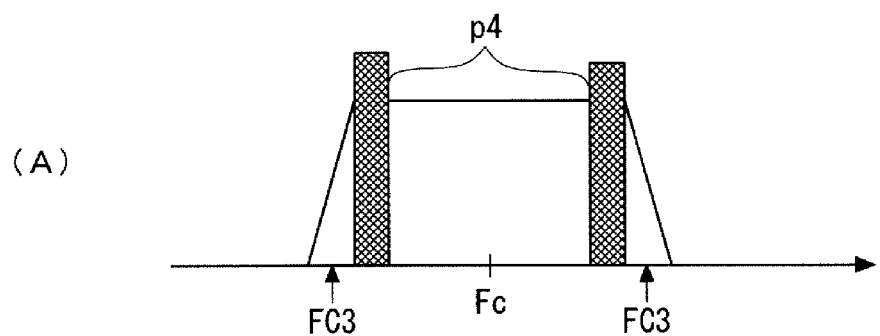
(B) 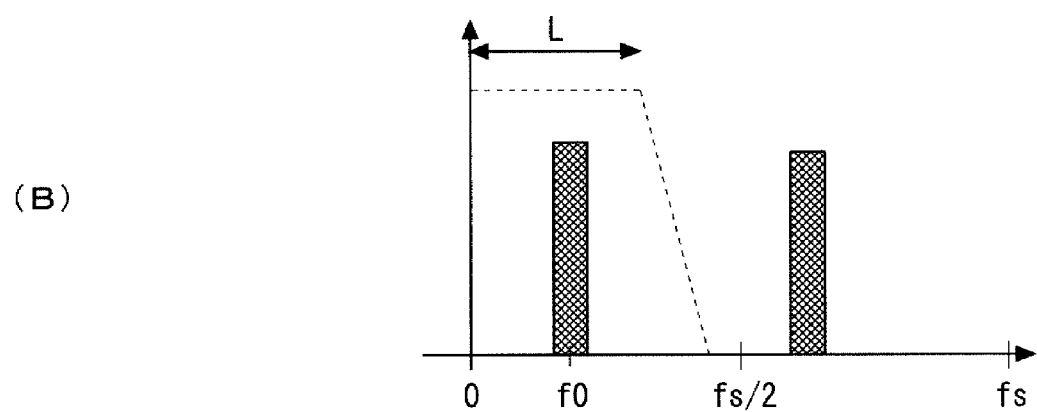
(C) 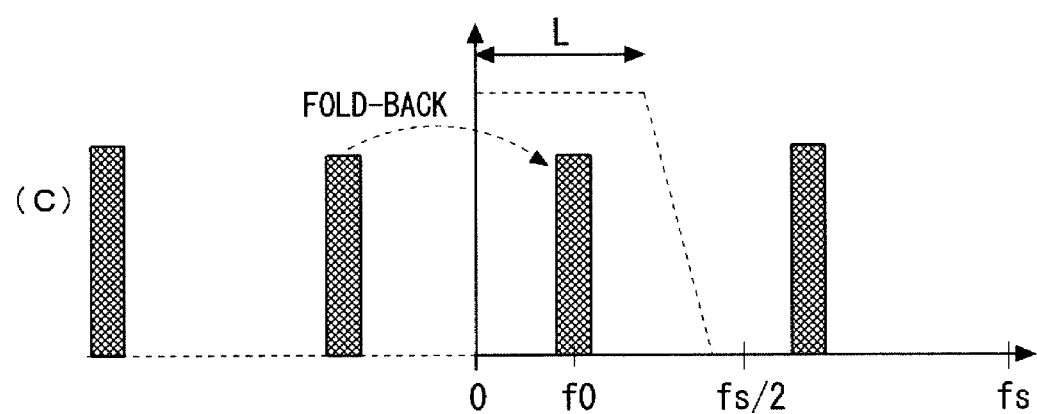

BMOD DIGITAL MODULATION UNIT

CORRECTION COEFFICIENT

BDEM DIGITAL DEMODULATION UNIT

IQ IMBALANCE CORRECTION METHOD IN A WIRELESS COMMUNICATION DEVICE INCLUDING A QUADRATURE MODULATION/DEMODULATION FUNCTION

CROSS-REFERENCE TO RELATED APPLICATION

The disclosure of Japanese Patent Application No. JP2010-065034 filed on Mar. 19, 2010 including the specification, claims, drawings and abstract is incorporated herein by reference in its entirety.

FIELD

The present invention relates to an IQ imbalance correction method in a wireless communication device including a quadrature modulation/demodulation function.

BACKGROUND

Wireless communication devices (direct conversion wireless devices) that include a direct quadrature modulation/demodulation function have been known in which frequency conversion is performed once to convert a baseband (BB) signal into a radio frequency (RF) signal and transmit the RF signal, and a received RF signal is converted into a BB signal by performing frequency conversion (inverse frequency conversion) once. This type of wireless communication device does not need an intermediate frequency (IF) stage for processing IF signals, which gives the wireless communication device an advantage in that an increase in hardware scale is averted.

However, a quadrature modulator/demodulator of this type of wireless communication device cannot avoid in-phase and quadrature imbalance (IQ imbalance) in frequency conversion (quadrature modulation) and inverse frequency conversion (quadrature demodulation) due to the incompleteness of hardware (more strictly, analog hardware components). IQ imbalance is, in other words, interference between an I (in-phase) channel and a Q (quadrature phase) channel in a quadrature modulator/demodulator which is caused by gain imbalance between the I channel and the Q channel and by a quadrature error between the I channel and the Q channel. IQ imbalance occurs particularly frequently when a high frequency such as a frequency in the millimeter band is used for communication, when a broadband signal is handled, or when inexpensive components are employed.

IQ imbalance that occurs in a quadrature modulator/demodulator is expressed as the respective amplitude deviations of the quadrature modulator/demodulator's I channel and Q channel (ati, atq, ari, arq), and the respective phase deviations of the I channel and the Q channel ($+\phi/2$, $-\phi/2$, $+\psi/2$, $-\psi/2$) (see FIG. 1). Those imbalances cause interference between frequency components that are symmetric to each other with respect to a center frequency (Fc) of a carrier (carrier wave). In other words, image signals are generated at axisymmetric frequencies (see FIG. 2). The signal quality is thus deteriorated.

In order to avoid this signal quality deterioration, various methods of compensating (correcting) IQ imbalance have been proposed. The proposed methods include a first type of related art for correcting IQ imbalance in a wireless communication device, which removes interference by transmitting from a transmitter side a training signal that is known to a receiver side, and then correcting IQ imbalances of the transmitter and the receiver and the channel characteristics of a propagation environment at once based on a change in the training signal that is observed on the receiver side.

With the method of the first type of related art, the training signal transmitted has been affected by the transmitter side IQ imbalance, and hence, even if an ideal receiver is provided, the influence of the interference cannot be removed unless a correction is made on the receiver side as well.

The proposed methods also include a second type of related art in which correction coefficients for separate corrections on a transmission side and a reception side (separate corrections in a transmission part and in a reception part) are calculated to correct characteristics, and a signal to be transmitted is processed to approach to its ideal form.

To give a more detailed description, in the second type of related art, a path along which a transmission signal is fed back to the reception side is provided, and the path is used when the correction coefficients are calculated to feed back a training signal sent from the transmission side so that the training signal is received on the receiver side. Calculating the correction coefficients also involves IF sampling which is conducted in an analog/digital (A/D) converter by shifting the oscillation frequency of a local oscillator. Signals sampled by IF sampling undergo quadrature demodulation in a digital circuit area. A digital circuit operates as an ideal receiver because quadrature demodulation in a digital circuit is free from the influence of IQ imbalance which is unique to analog circuits.

Therefore, in the second type of related art, an imbalance coefficient that takes into account only the influence of the transmission side IQ imbalance can be calculated by analyzing the received training signal. The calculated transmission side imbalance coefficient is used to correct the IQ imbalance on the transmission side. After the transmission side correction, the training signal is transmitted again and, this time, the reception side local oscillator is operated at a normal oscillation frequency to perform baseband sampling in a normal manner. Thereafter, the received training signal is analyzed to calculate an IQ imbalance correction coefficient for the reception side, and the IQ imbalance on the reception side is corrected with the calculated coefficient.

The method of the second type of related art can remove the influence of IQ imbalance on a transmission signal which is a problem of the first type of related art, but requires an A/D converter that has a band twice or more wider than normal (four times or more wider than the baseband frequency band according to the sampling theorem), in order to execute IF sampling on the reception side. In addition, although capable of removing the influence of IQ imbalance, the second type of related art has difficulties in removing amplitude frequency deviations and phase frequency deviations that are present in intervening analog parts (for example, a low pass filter LPF).

The following are related arts to the invention.

[Patent document 1] Japanese Patent Laid-Open Publication No. JP 2007-60106

[Patent document 2] Japanese Patent Laid-Open Publication No. JP 2008-167057

[Patent document 3] Japanese Patent Laid-Open Publication No. JP 2008-263585

[Patent document 4] Japanese Patent Laid-Open Publication No. JP 2005-527152

[Non-patent document 1] Kamata Hiroyuki, Sakaguchi Kei, and Araki Kiyomichi, "Effects of IQ Imbalance and Effective Compensation Scheme on the MIMO-OFDM Communication System", Technical report of IEICE, WBS 2004-57, 2005

[Non-patent document 2] Tanabe Yasuhiko, Egashira Yoshimasa, and Sato Kazumi, "A study on IQ Imbalance Correction Scheme for MIMO-OFDM Systems", Technical report of IEICE, RCS 2006-272, 2007

SUMMARY

According to an aspect of the disclosures made herein, an IQ imbalance correction method, which is executed in a wireless communication device including a quadrature modulation/demodulation function in an analog circuit area, including: transmitting a plurality of pairs of radio frequency (RF) training signals in installments by pairing RF training signals symmetric with respect to a center frequency on a frequency axis; setting a reception local frequency to change to a frequency that is suitable to receive, via an internal path, instead of exterior space, each of the plurality of pairs of RF training signals transmitted in installments, and suitable to convert the each of the plurality of pairs of RF training signals into intermediate frequency (IF) training signals; performing analog/digital conversion on the IF training signals and then performing quadrature demodulation on the IF training signals, respectively, in a digital circuit area to generate baseband (BB) training signals; calculating correction coefficients for correcting IQ imbalance when demodulation is performed on the BB training signals, respectively, in the digital circuit area; and correcting IQ imbalance of a transmission part, which includes a quadrature modulation function, with use of a correction coefficient for an entire frequency range.

The objects and advantages of the invention will be realized and attained by means of the elements and combinations particularly pointed out in the claims.

BRIEF DESCRIPTION OF THE DRAWINGS

FIG. 14 is a diagram illustrating training signals in the second IQ imbalance correction processing;

FIG. 15 is a diagram illustrating training signals in the second IQ imbalance correction processing;

FIG. 17 is a diagram illustrating training signals in the second IQ imbalance correction processing;

FIG. 19 is a diagram illustrating training signals in the third IQ imbalance correction processing;

FIG. 21 is a diagram illustrating training signals in the third IQ imbalance correction processing;

FIG. 23 is a diagram illustrating training signals in the fourth IQ imbalance correction processing;

FIG. 24 is a diagram illustrating training signals in the fourth IQ imbalance correction processing;

FIG. 25 is a diagram illustrating training signals in the fourth IQ imbalance correction processing;

FIG. 26 is a diagram illustrating training signals in the fourth IQ imbalance correction processing;

DESCRIPTION OF EMBODIMENTS

Figure 1:
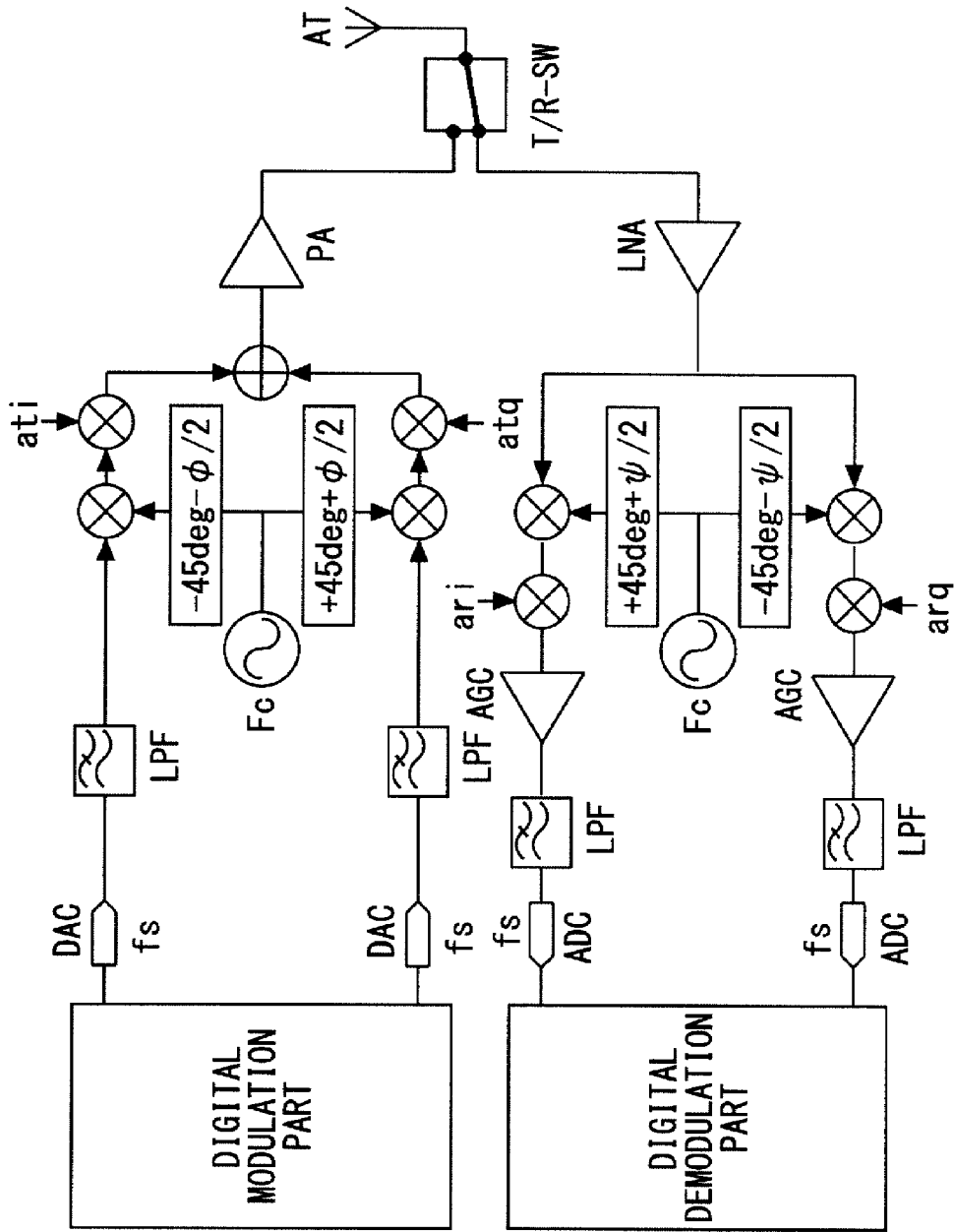
FIG. 1 is a diagram illustrating amplitude deviations and phase deviations of an I channel and a Q channel that are observed when IQ imbalance occurs in a conventional quadrature modulator/demodulator of a wireless communication device.
Figure 2:
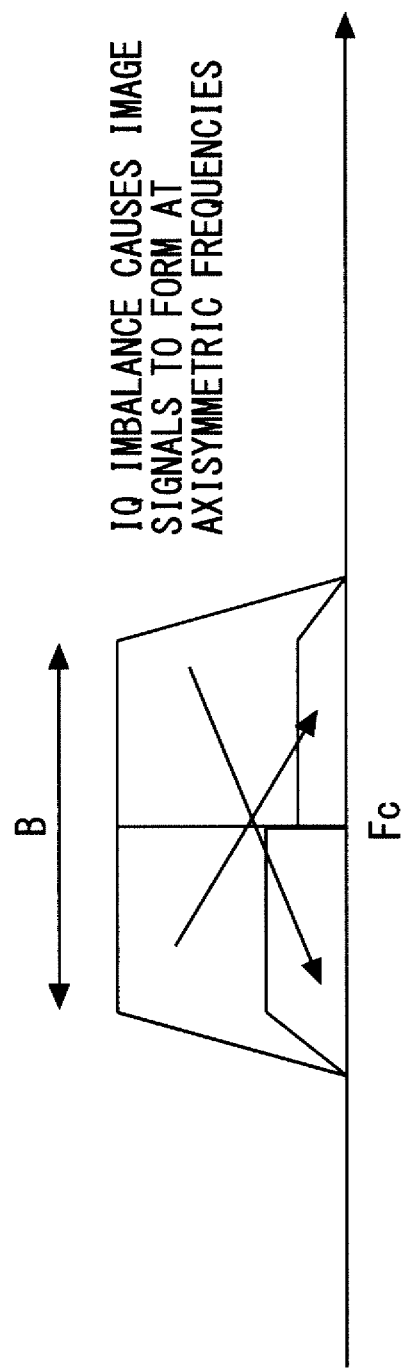
FIG. 2 is a diagram illustrating signal interference due to IQ imbalance in the conventional quadrature modulator/demodulator of the wireless communication device.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

[Direct Quadrature Modulation/Demodulation Device of an Embodiment]

[Device Configuration and Functions]

Figure 3:
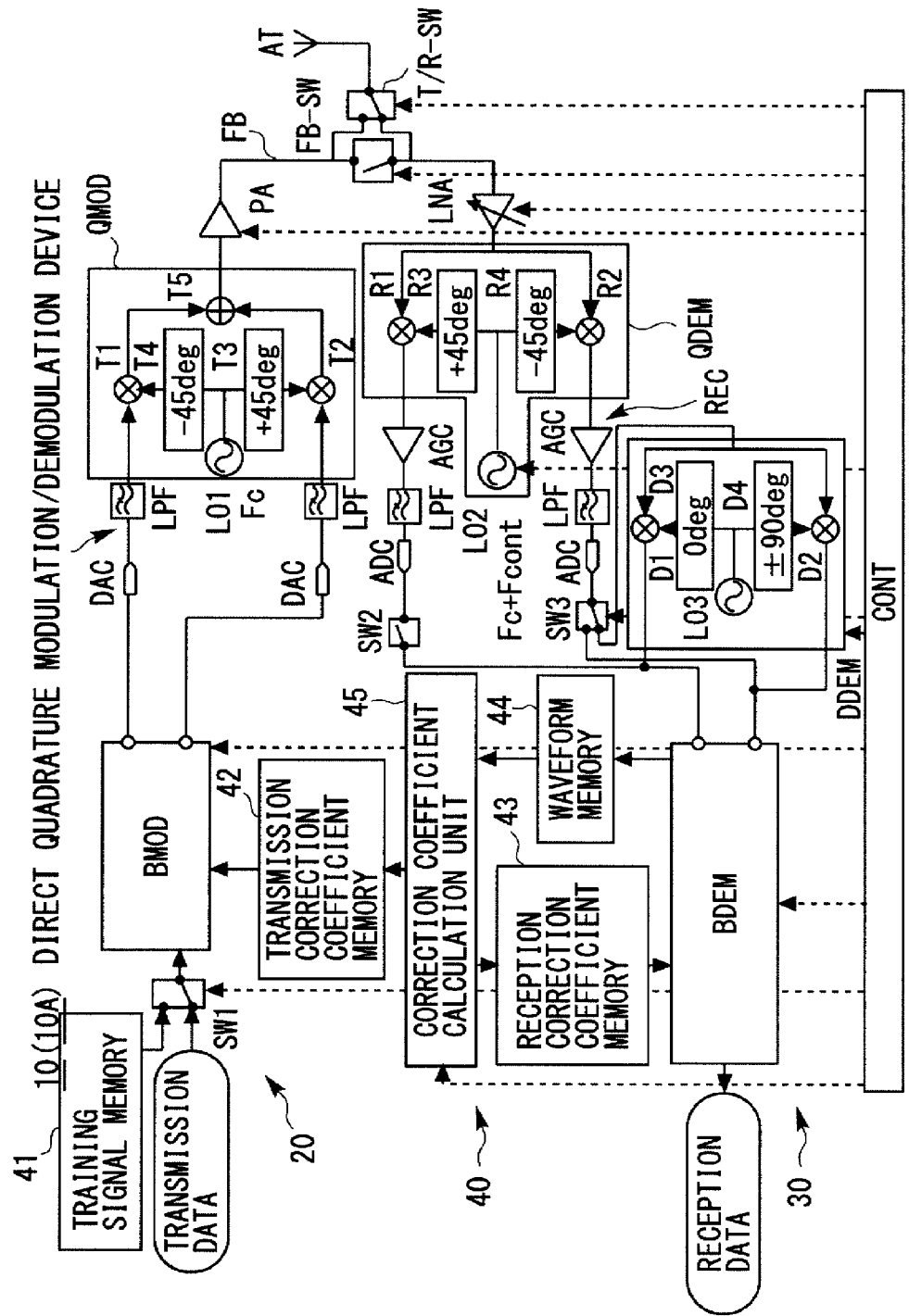
FIG. 3 is a block diagram illustrating a configuration of a direct quadrature modulation/demodulation device according to an embodiment and a modification example of the present invention.

FIG. 3 illustrates a device configuration according to an embodiment of the present invention. With reference to FIG. 3, a direct quadrature modulation/demodulation device 10 as a wireless communication device includes a transmission function part 20, a reception function part 30, a correction function part 40, a control part CONT, and a transmission/reception antenna AT.

The transmission function part 20 includes a digital modulation unit BMOD and an analog circuit area transmission part TR. The reception function part 30 includes a digital demodulation unit BDEM and an analog circuit area reception part REC. The correction function part 40 includes a training signal memory 41, a transmission correction coefficient memory 42, a reception correction coefficient memory 43, a waveform memory 44, a correction coefficient calculation unit 45, and a plurality of switches, which include SW1, SW2, SW3, and FB-SW. The correction function part 40 further includes a digital quadrature demodulation unit DDEM.

The direct quadrature modulation/demodulation device 10 is a zero-IF direct-conversion wireless device which transmits a radio frequency (RF) signal obtained by performing frequency conversion once on a baseband (BB) signal, and which converts a received RF signal into a BB signal by performing frequency conversion (inverse frequency conversion) once. The direct quadrature modulation/demodulation device 10 does not handle intermediate frequency (IF) signals in normal communications.

However, this direct quadrature modulation/demodulation device 10 includes in the correction function part 40 the digital quadrature demodulation unit DDEM, which demodulates an IF signal into a BB signal by quadrature demodulation, in order to correct IQ imbalance due to quadrature modulation and quadrature demodulation in the analog circuit area.

To give a more detailed description, in this embodiment, the transmission function part 20 transmits an orthogonal frequency division multiplexing (OFDM) signal that is obtained by multicarrier modulation. In the digital modulation unit BMOD, which is one of the components constituting the transmission function part 20, transmission signals input in series are converted by performing serial/parallel conversion on an OFDM symbol basis, and separately undergo subcarrier modulation. The transmission signals are normal transmission data or training signals TRS, and are a bit stream in either case.

In the digital modulation unit BMOD, the transmission signals are multiplied by transmission correction coefficients on a subcarrier basis, undergo OFDM modulation through an inverse Fourier transform (inverse fast Fourier transform (IFFT) or inverse discrete Fourier transform (IDFT)) operation, and are added with cyclic prefixes (CPs), which act as guard intervals (GIs), to generate transmission baseband signals (complex signals). An initial value of a transmission correction coefficient that is an all-1 value is equivalent to no correction, and an all-1 value may be stored until a correction value is calculated.

Figure 4:
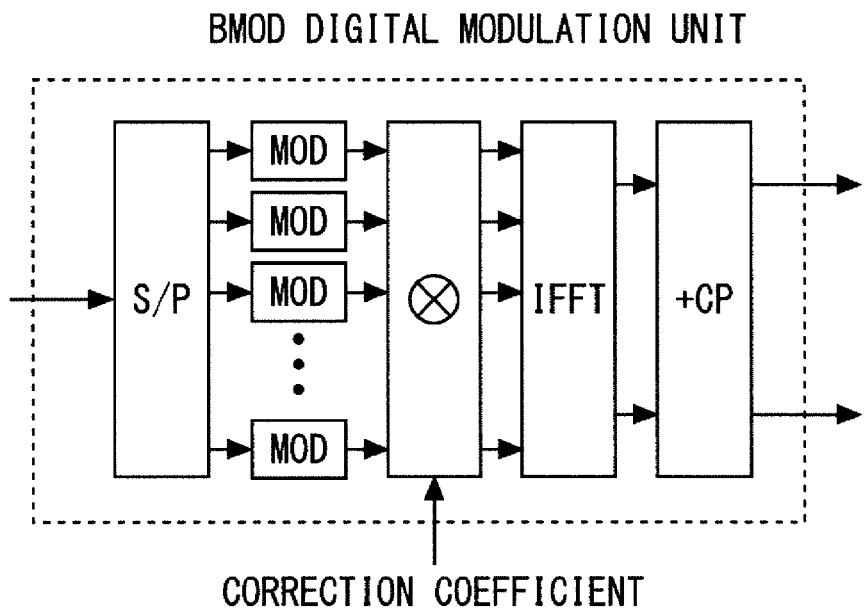
FIG. 4 is a block diagram illustrating a detailed configuration of a digital modulation unit in the direct quadrature modulation/demodulation device according to the embodiment.

In order to implement this function, the digital modulation unit BMOD includes, as illustrated in a detailed configuration example of FIG. 4, a serial/parallel (S/P) converter S/P, a plurality of modulators MOD, a multiplier MP, an inverse Fourier transformer IFFT, and a cyclic prefix adding circuit +CP.

The complex BB signals are input from the digital modulation unit BMOD to the transmission part TR, which is one of the components constituting the transmission function part 20, and which uses digital/analog (D/A) converters DAC to perform digital/analog conversion separately on the real components and imaginary components of the complex BB signals. The transmission part TR inputs the converted signal components to their associated low pass filters LPF. The respective low pass filters LPF perform band limiting processing, and the resultant analog BB signals are modulated into RF signals by direct quadrature modulation (hereinafter, also referred to as direct conversion) performed by the quadrature modulation unit QMOD with the use of a cosine wave signal and a sine wave signal that have a carrier frequency (local frequency) Fc. The quadrature modulation unit QMOD inputs the obtained RF signals as transmission signals to a power amplifier (transmission amplifier) PA. In direct conversion, quadrature modulation is executed along with frequency conversion to an RF signal. To implement this quadrature modulation function, the quadrature modulation unit QMOD includes a local oscillator LO1, mixers (multipliers) T1 and T2, a +45° phase shifter T3, a −45° phase shifter T4, and a combiner T5. The transmission signals input from the quadrature modulation unit QMOD undergo given power amplification in the power amplifier PA, and then the transmission part TR transmits the amplified transmission signals.

In this embodiment, the reception part REC, which is one of the components constituting the reception function part 30 for demodulating a received OFDM signal, uses a low noise amplifier (reception amplifier) LNA to perform given power amplification on reception signals, and inputs the amplified reception signals to a quadrature demodulation unit QDEM.

The quadrature demodulation unit QDEM demodulates the reception signals into BB signals by direct quadrature demodulation (hereinafter, also referred to as direct conversion) with the use of a cosine wave signal and a sine wave signal that have the carrier frequency Fc. To implement this quadrature demodulation function, the quadrature demodulation unit QDEM includes a local oscillator LO2, mixers (multipliers) R1 and R2, a +45° phase shifter R3, and a −45° phase shifter R4.

The quadrature demodulation unit QDEM inputs those signals converted by inverse frequency conversion to their associated automatic gain controllers AGC, in order to adjust the gain of each of the signals. The automatic gain controllers AGC then input analog baseband signals to their associated low pass filters LPF of the reception function part 30, where high frequency components are removed from the baseband signals. Generally speaking, a pass band L of the low pass filters LPF is designed so that at least components in ½ (B/2) of the entire band of a baseband signal are allowed to pass. The low pass filters LPF input the BB signals to their associated analog/digital (A/D) converters ADC, where the BB signals are sampled and converted into digital signals.

In normal communications, the digital demodulation unit BDEM, which is one of the components constituting the reception function part 30, removes cyclic prefixes (CPs) from the real components and imaginary components of the complex digital BB signals input by the A/D converters ADC, and performs OFDM demodulation by changing the BB signals back to frequency domain signals from time domain signals by Fourier transform (fast Fourier transform (FFT) or discrete Fourier transform (DFT)). In the case of correction coefficient calculation for correcting IQ imbalance, the digital demodulation unit BDEM operates in the same manner based on complex digital BB signals that are input from the digital quadrature demodulation unit DDEM.

The frequency domain signals obtained by the Fourier transform are stored as correction coefficient calculation-use signals in the waveform memory 44, and are also input to a multiplier MP of the reception function part 30. When reception correction coefficients are available, the multiplier MP multiplies the signals transformed by the Fourier transform by the reception correction coefficients on a subcarrier basis, and the signals are thus corrected.

The signals from the multiplier MP are separately demodulated by subcarrier demodulation in a plurality of demodulators DEM. The OFDM symbol-based signals obtained by subcarrier demodulation undergo parallel/serial conversion by a parallel/serial (P/S) converter P/S, which outputs the resultant signals as reception signals. The reception signals are normal reception data or training signals TRS, and are a bit stream in either case.

Figure 5:
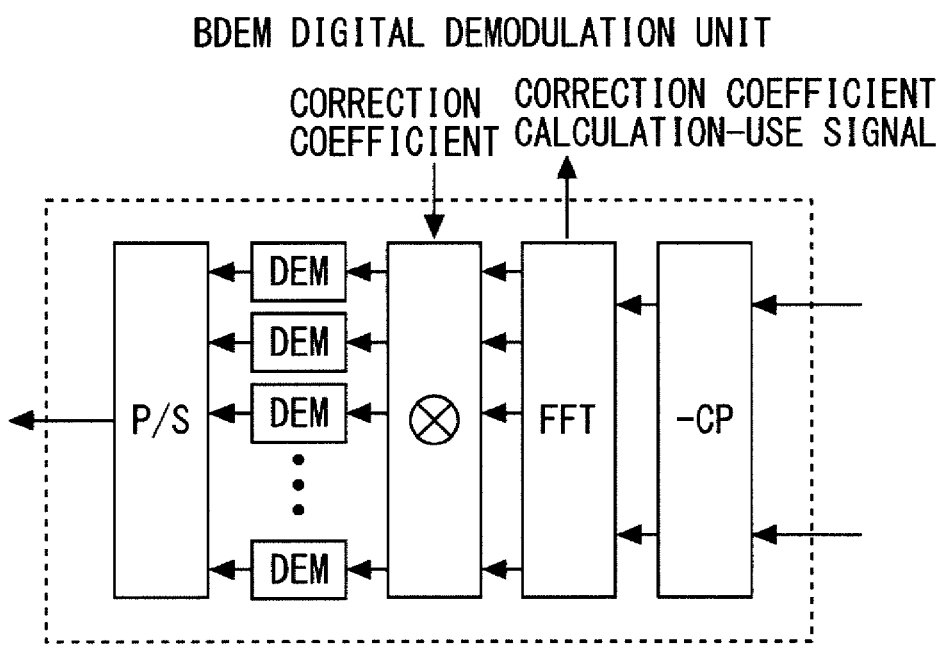
FIG. 5 is a block diagram illustrating a detailed configuration of a digital demodulation unit in the direct quadrature modulation/demodulation device according to the embodiment.

In order to implement this function, the digital demodulation unit BDEM includes, as illustrated in a detailed configuration example of FIG. 5, the parallel/serial (P/S) converter P/S, the plurality of demodulators DEM, the multiplier MP, a Fourier transformer FFT, and a cyclic prefix removing circuit-CP.

The digital quadrature demodulation unit DDEM is selectively connected to the quadrature demodulation unit QDEM in order to calculate an IQ imbalance correction coefficient, and performs quadrature demodulation on an IF signal from the quadrature demodulation unit QDEM with the use of a cosine wave signal and a sine wave signal that have a given carrier frequency. The digital quadrature demodulation unit DDEM inputs the resultant digital BB signal to the digital demodulation unit BDEM. In order to implement this quadrature demodulation function, the digital quadrature demodulation unit DDEM includes a digital local oscillator LO3, mixers (multipliers) D1 and D2, a 0° phase shifter D3, and a +/−90° phase shifter D4.

To calculate a correction coefficient for correcting IQ imbalance, the correction function part 40 operates in conjunction with the transmission function part 20 and the reception function part 30 in a manner described below. The control part CONT sets, in advance, various necessary settings in components such as the switches SW1, SW2, SW3, the feedback switch FB-SW, the power amplifier PA, the low noise amplifier LNA, and the local oscillator LO2.

First, to calculate transmission correction coefficients, training signals TRS are loaded from (read out of) the training signal memory 41 via the switch SW1 onto the digital modulation unit BMOD, where serial/parallel conversion is performed on the training signals TRS on an OFDM symbol basis, thereby modulating the training signals TRS by subcarrier modulation. The training signals TRS are then output from the digital modulation unit BMOD as the real components and imaginary components of complex BB signals that have undergone OFDM modulation through an inverse Fourier operation.

The training signals TRS from the digital modulation unit BMOD are input to the transmission part TR, and are processed as the real components and imaginary components of the complex BB signals by their associated D/A converters DAC and their associated low pass filters LPF. Thereafter, the training signals TRS are input to the I (in-phase) channel side and Q (quadrature phase) channel side of the quadrature modulation unit QMOD. In the quadrature modulation unit QMOD, the training signals (analog BB signals) TRS are modulated into RF signals by direct quadrature modulation with the use of a cosine wave signal and a sine wave signal that have the carrier frequency Fc.

The training signals TRS in the RF band are transmitted as transmission signals to the reception function part 30 from the power amplifier PA, where gain control is executed in advance, via a feedback path FB, which includes the feedback switch FB-SW.

In the reception function part 30, the RF training signals TRS as reception signals undergo given power amplification performed by the low noise amplifier LNA, where gain control is executed in advance. The RF training signals TRS are then input to the quadrature demodulation unit QDEM of the reception part REC. The quadrature demodulation unit QDEM demodulates the RF training signals TRS by quadrature demodulation into IF signals with the use of a cosine wave signal and a sine wave signal that have a local frequency Fc+Fcont of the local oscillator LO2, where a frequency change is set in advance.

The training signals (analog IF signals) TRS are output as digital IF signals from the reception part REC via their associated automatic gain controllers AGC, low pass filters LPF, and A/D converters ADC. Here, the switch SW2 is controlled in advance to be open and the switch SW3 is controlled in advance to execute controlled switching. The training signals (digital IF signals) TRS are therefore input to the digital quadrature demodulation unit DDEM via a Q branch from the A/D converter ADC that is associated with the Q channel of the reception part REC.

In the digital quadrature demodulation unit DDEM, the training signals TRS input from the reception part REC which are digital IF signals are put through quadrature demodulation with the use of a cosine wave signal and a sine wave signal that have the local frequency of the digital local oscillator LO3, to thereby obtain real components and imaginary components as complex digital BB signals.

The resultant training signals TRS which are complex digital BB signals are input from the digital quadrature demodulation unit DDEM to the digital demodulation unit BDEM to be demodulated by OFDM demodulation through a Fourier transform operation. The training signals (frequency domain signals) TRS obtained through the Fourier transform operation are input to the waveform memory 44 as correction coefficient calculation-use signals. The correction coefficient calculation-use signals are sent from the waveform memory 44 to the correction coefficient calculation unit 45.

The correction coefficient calculation unit 45 calculates a transmission correction coefficient from the input signal. The calculated transmission correction coefficient is stored in the transmission correction coefficient memory 42. The correction coefficient can be calculated by the methods described in Non-patent documents 1 and 2. The training signal TRS is transmitted while split over the signal band, and combined upon reception as will be described later.

How the direct quadrature modulation/demodulation device 10 operates to calculate a reception correction coefficient is described next. Some functions of the transmission function part 20 and the reception function part 30, which operate in conjunction with the correction function part 40, are the same as when a transmission correction coefficient is calculated, and these functions are omitted from the following description unless clarification is necessary.

Training signals TRS of the entire band are loaded from the training signal memory 41 via the switch SW1 onto the digital modulation unit BMOD, where subcarrier modulation is performed. The training signals TRS modulated by the subcarrier modulation are multiplied by transmission correction coefficients from the transmission correction coefficient memory 42 to be corrected. The corrected training signals TRS are output from the digital modulation unit BMOD as the real components and imaginary components of complex digital BB signals that have undergone OFDM modulation through an inverse Fourier operation.

The training signals (complex digital BB signals) TRS from the digital modulation unit BMOD are input to the transmission part TR, specifically, to the I channel side and Q channel side of the quadrature modulation unit QMOD. The training signals TRS converted by D/A conversion which are analog BB signals are modulated by direct quadrature modulation into RF signals in the quadrature modulation unit QMOD.

The RF training signals TRS processed by the quadrature modulation are transmitted as transmission signals to the reception function part 30 from the power amplifier PA, where gain control is executed in advance, via the feedback path FB, which includes the feedback switch FB-SW.

In the reception function part 30, the RF training signals TRS of the entire band which are reception signals undergo given power amplification performed by the low noise amplifier LNA, where gain control is executed in advance. The RF training signals TRS are then input to the quadrature demodulation unit QDEM of the reception part REC. The quadrature demodulation unit QDEM demodulates the RF training signals TRS by quadrature demodulation into analog BB signals with the use of a cosine wave signal and a sine wave signal that have the local frequency Fc+Fcont (Fcont=0)) of the local oscillator LO2, where a change to the same frequency as the local frequency Fc of the local oscillator LO1 is set in advance.

The training signals (complex digital BB signals) TRS processed by quadrature demodulation are input from the quadrature demodulation unit QDEM via the switches SW2 and SW3, which are set in advance to a normal state, to the digital demodulation unit BDEM, where a Fourier transform operation is performed to demodulate the training signals TRS by OFDM demodulation. The demodulated training signals (frequency domain signals) TRS are input to the waveform memory 44 as correction coefficient calculation-use signals. The correction coefficient calculation-use signals are sent from the waveform memory 44 to the correction coefficient calculation unit 45.

The correction coefficient calculation unit 45 calculates reception correction coefficients from the input signals. The calculated reception correction coefficients are stored in the reception correction coefficient memory 43.

A case of executing normal communication in this state is described. Some functions of the transmission function part 20 and the reception function part 30, which operate in conjunction with the correction function part 40, are the same as when a transmission correction coefficient is calculated and when a reception correction coefficient is calculated. These functions are therefore omitted from the following description unless clarification is necessary.

Transmission signals that are normal transmission data are input to the digital modulation unit BMOD via the switch SW1, where switching settings are set in advance. The transmission signals input in series undergo subcarrier modulation in the digital modulation unit BMOD. The transmission signals modulated by the subcarrier modulation are multiplied by transmission correction coefficients from the transmission correction coefficient memory 42 to be corrected. The corrected transmission signals are output from the digital modulation unit BMOD as the real components and imaginary components of complex digital BB signals modulated by OFDM modulation through an inverse Fourier operation.

The transmission signals (complex digital BB signals) from the digital modulation unit BMOD are input to the transmission part TR, specifically, to the I channel side and Q channel side of the quadrature modulation unit QMOD. The transmission signals converted by D/A conversion which are analog BB signals are modulated by direct quadrature modulation into RF signals in the quadrature modulation unit QMOD.

The transmission signals processed by the quadrature modulation are transmitted as transmission signals in the RF band to the exterior space from the power amplifier PA, where gain control is executed in advance, via a switch T/R-SW and via the transmission/reception antenna AT.

In the reception function part 30, reception signals in the RF band undergo given power amplification performed by the low noise amplifier LNA, where gain control is executed in advance. The reception signals are then input to the quadrature demodulation unit QDEM of the reception part REC. The quadrature demodulation unit QDEM demodulates the reception signals by direct quadrature demodulation into complex analog BB signals with the use of a cosine wave signal and a sine wave signal that have the local frequency Fc+Fcont (Fcont=0) of the local oscillator LO2, where a change to the same frequency as the local frequency Fc of the local oscillator LO1 is set in advance.

The complex analog BB signals processed by the quadrature demodulation are output from the reception part REC as digital BB signals to be input to the digital demodulation unit BDEM via the switches SW2 and SW3, which are set in advance to a normal state.

The reception signals TRS input from the reception part REC which are digital BB signals undergo OFDM demodulation through a Fourier transform operation in the digital demodulation unit BDEM. The subcarrier-based BB signals (frequency domain signals) obtained through the Fourier transform operation are multiplied by reception correction coefficients, which are loaded from (read out of) the reception correction coefficient memory 43, to be corrected.

The plurality of modulators DEM respectively demodulate the subcarrier-based BB signals that have been corrected. OFDM symbol-based BB signals demodulated by subcarrier demodulation undergo P/S conversion and are then output as reception signals.

In order to implement the functions described above, the control part CONT exerts overall control on the direct quadrature modulation/demodulation device 10. The dotted-line arrows in FIG. 3 represent major control lines from the control part CONT to the respective components of the device.

[IQ Imbalance Correction Processing]

A description is given next with reference to relevant drawings on an example of IQ imbalance correction processing in the direct quadrature modulation/demodulation device 10 according to the embodiment which is illustrated in FIG. 3.

[Outline of the IQ Imbalance Correction Processing]

In the direct quadrature modulation/demodulation device 10 according to the embodiment, the feedback path FB which includes the feedback switch FB-SW is provided so that a transmission signal from the transmission part TR can be received by the reception part REC.

Figure 6:
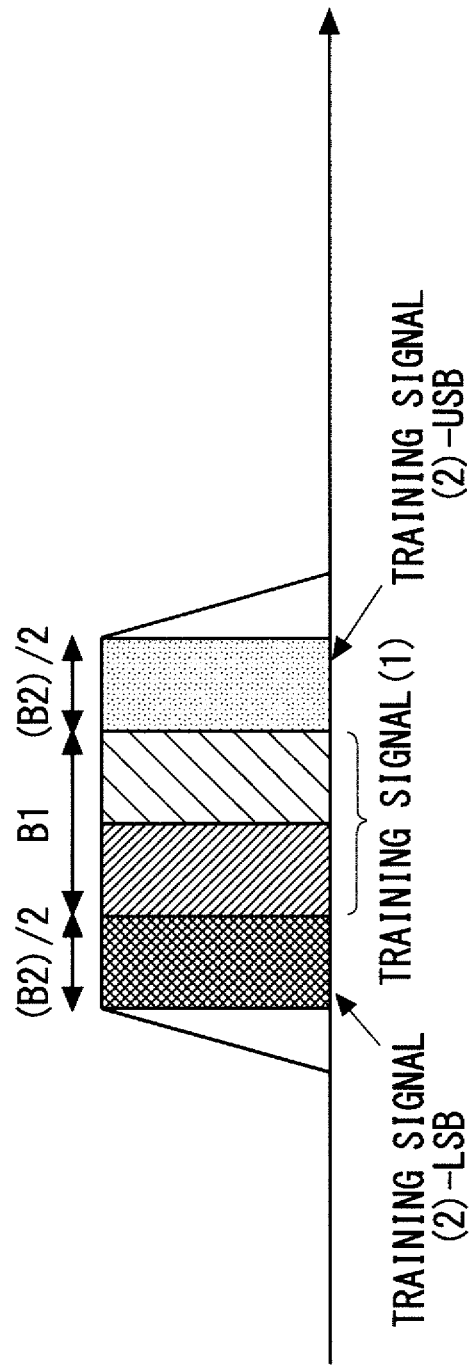
FIG. 6 is a diagram illustrating training signals in first IQ imbalance correction processing.

An instruction from the control part CONT triggers the transmission function part 20 to transmit training signals TRS in installments, by pairing a training signal TRS having an upper side band (USB) radio frequency (RF) and a training signal TRS having a lower side band (LSB) radio frequency (RF), which are symmetric with respect to the center frequency Fc on the frequency axis (see FIG. 6, for example). The number of pairs into which training signals TRS are divided into can be set arbitrarily. However, as is described later, when a pair of divided RF signals are received as IF signals, the center frequency can be varied such that both signals forming the pair are received simultaneously under reception band constraints of the digital conversion parts (LPF and ADC described below), or such that the signals forming the pair are received separately, one at a time, under conditions that do not cause interference between the signals.

The reception part REC of the reception function part 30 receives the RF training signals TRS at the local frequency Fc+Fcont, which differs from the transmission local frequency (carrier frequency) Fc. The reception local frequency Fcont takes a value that varies depending on the transmission pattern of the RF training signals TRS.

Figure 7:
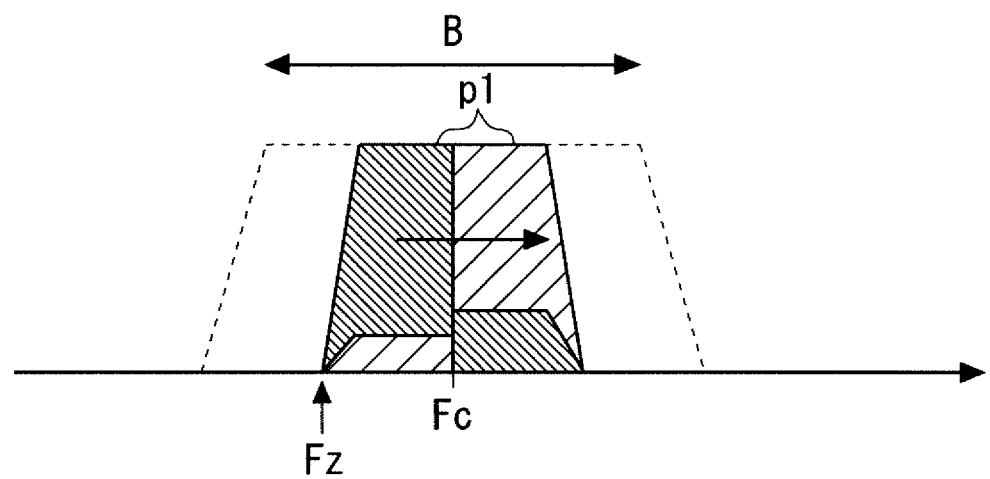
FIG. 7 is a diagram illustrating training signals in the first IQ imbalance correction processing.

When there is an IQ imbalance, the RF training signals TRS fed back to be received by the reception part REC contain image signals symmetric with respect to the center frequency Fc (see FIG. 7, for example). After changing the reception local frequency Fc+Fcont to a frequency Fz (Fcont=−f1) is set, the RF training signals TRS containing the image signals undergo frequency conversion. The training signals TRS are then sampled by IF sampling at a sampling frequency fs in the analog/digital (A/D) converters ADC as analog intermediate frequency (IF) signals having a center frequency f1 (see FIG. 8, for example).

In the case where the combined band of a pair of divided signals is not contained within the band L of LPF (for example, in the case of training signals (2) in FIG. 6), it is preferred to transmit the RF training signals TRS in two installments. In the first transmission, the training signals TRS undergo frequency conversion with the reception local frequency Fc+Fcont set to be changed to a frequency FL (Fcont=−F2L−f2) (see FIG. 9, for example). The reception part REC is then set such that only one of the upper side band signal and the lower side band side signal passes the band L of LPF (for example, see the training signal (2)-LSB in FIG. 6).

Figure 11:
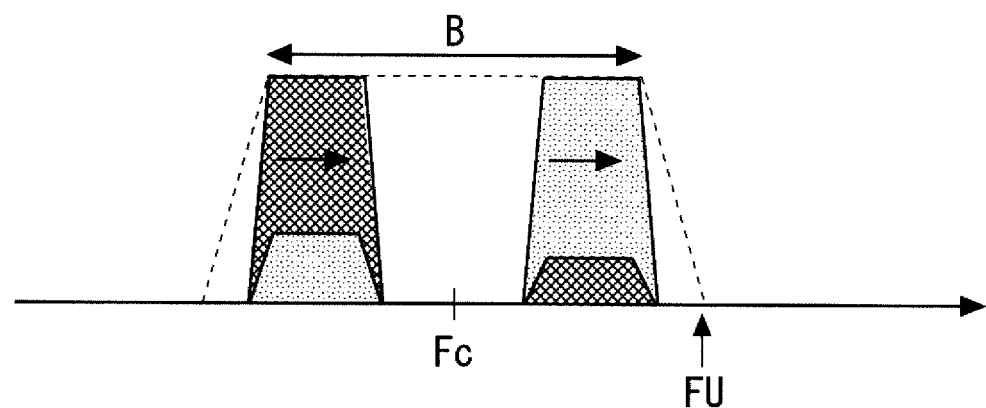
FIG. 11 is a diagram illustrating training signals in the first IQ imbalance correction processing.

In the second transmission, the training signals TRS undergo frequency conversion with the reception local frequency Fc+Fcont set to be changed to a frequency FU (Fcont=+F2R+f2, FU>FL) (see FIG. 11, for example). The reception part REC is then set such that the other of the upper side band signal and the lower side band side signal which has not been chosen in the first transmission passes the band L of LPF (for example, see the training signal (2)-USB in FIG. 6). At this point, the IF training signals TRS sampled by IF sampling are inverted on the frequency axis as indicated by the dotted-line arrows in FIG. 12.

However, transmitting the RF training signals TRS divided into pairs in two installments is not always necessary, depending on how the reception local frequency Fc+Fcont is set to change. In other words, transmitting the RF training signals TRS in one installment is sufficient if the reception local frequency Fc+Fcont is set to change such that IF training signals TRS having a center frequency f2 which are to be taken out are contained within the reception bandwidth L of LPF without fail, while unnecessary signals are suppressed by LPF.

As described, the training signals TRS divided into pairs and received in installments are put through A/D conversion on the I channel side or the Q channel side, and then undergo digital quadrature demodulation processing suited to the center frequency. The training signals TRS are further put through baseband demodulation processing, and a transmission correction coefficient for correcting the IQ imbalance of the transmission part TR alone is calculated for each signal belonging to any of the pairs into which the training signals TRS are divided. Results of the calculation are added together to obtain a transmission correction coefficient for the entire data signal band.

Usually, when signals sampled by IF sampling are put through digital quadrature demodulation processing, this demodulation processing does not cause IQ imbalance by itself, which allows the IQ imbalance of the transmission part TR alone to be detected. Correcting the IQ imbalance of the transmission part TR with the transmission correction coefficient and subsequently correcting the IQ imbalance of the reception part REC provides seemingly the same effect as when the transmission part TR and the reception part REC are corrected separately.

Figure 27A:
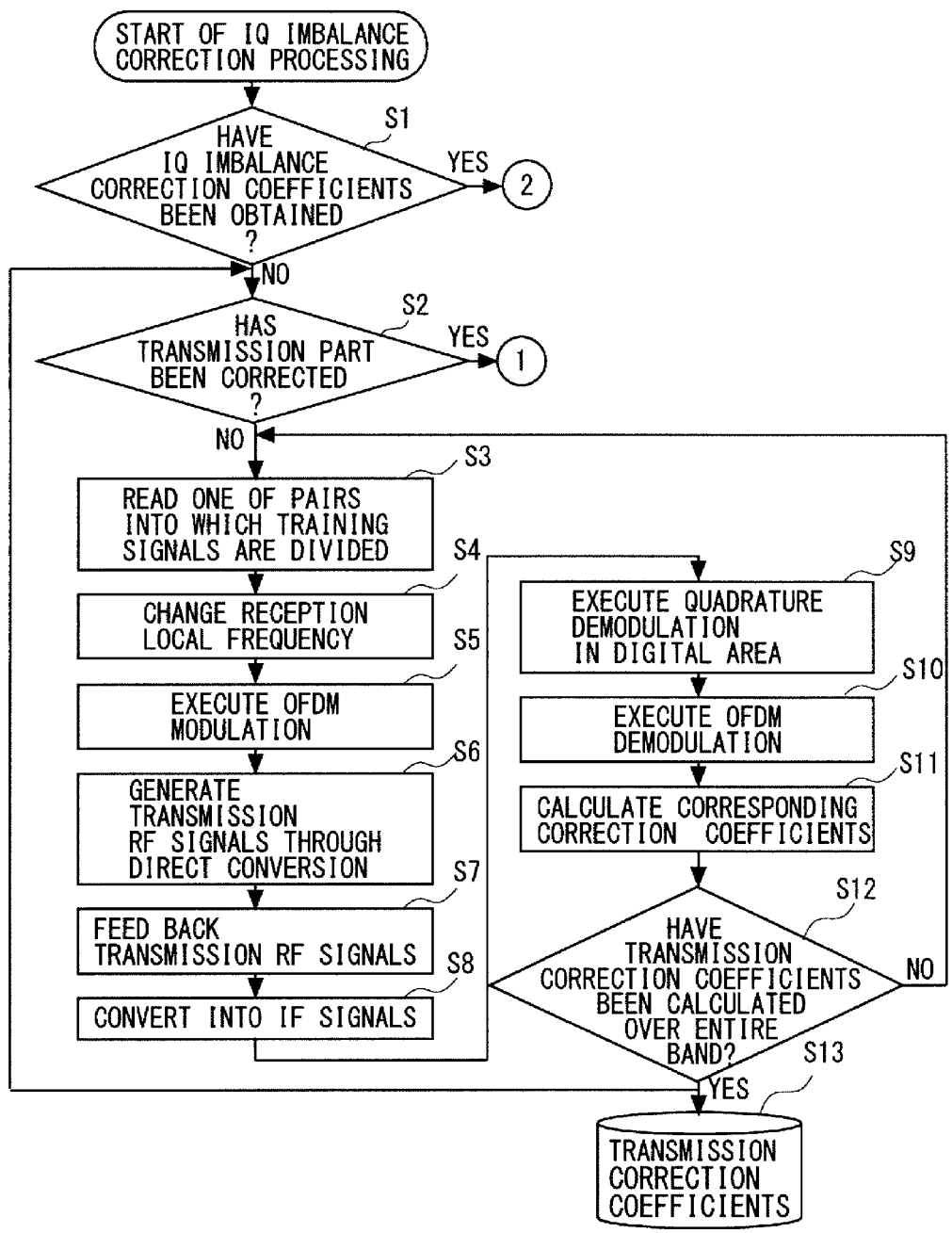
FIG. 27A is a flowchart outlining IQ imbalance correction processing.
Figure 27B:
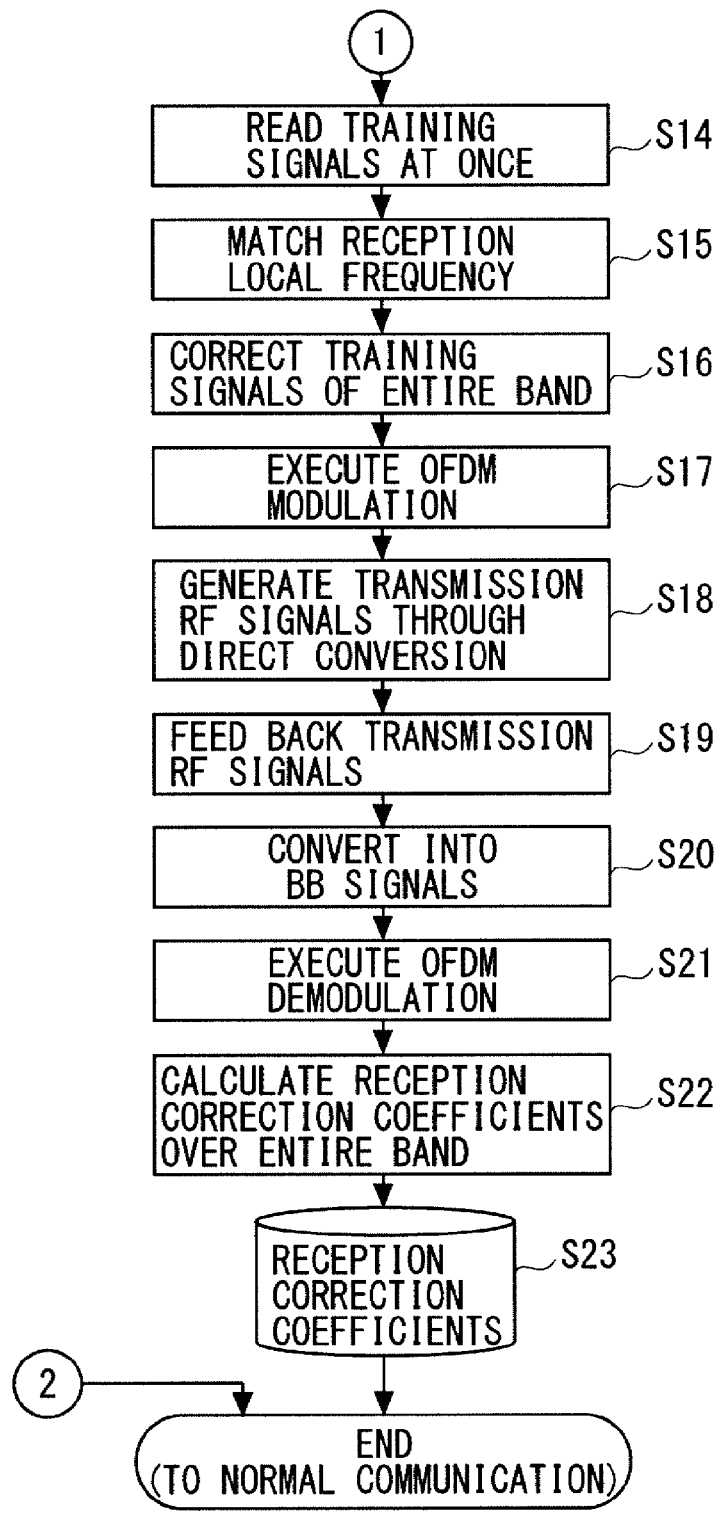
FIG. 27B is a flowchart outlining the IQ imbalance correction processing.

Referring to FIGS. 27A and 27B, a schematic flow of the IQ imbalance correction processing is described next. The control part CONT executes the IQ imbalance correction of the transmission part TR and the reception part REC through the following processing steps.

First, the control part CONT determines whether or not IQ imbalance correction coefficients have been obtained for the transmission part TR and the reception part REC (S1) and, when the correction coefficients have not been obtained, determines whether or not the transmission part TR has been corrected (S2). In the case where the transmission part TR has not been corrected, one of pairs into which BB training signals TRS are divided are read out of the training signal memory 41 (S3). The reception local frequency of the local oscillator LO2 is changed as well (S4).

The pair of divided BB training signals TRS undergo OFDM modulation in the digital modulation unit BMOD (S5). Thereafter, the quadrature modulation unit QMOD performs direct conversion to generate transmission RF signals (S6).

The transmission RF signals are fed back to the reception part REC (S7), and converted in the quadrature demodulation unit QDEM into IF signals (S8). The pair of divided IF training signals TRS undergo quadrature demodulation in the digital quadrature demodulation unit DDEM, which is in the device's digital area (S9).

The BB training signals TRS demodulated by the quadrature demodulation undergo OFDM modulation in the digital demodulation unit BDEM (S10). The correction coefficient calculation unit 45 calculates correction coefficients for the pair of divided BB training signals TRS (S11). The processing steps S3 to S11 are repeated until transmission correction coefficients for correcting the IQ imbalance of the transmission part TR alone are calculated over the entire band (entire frequency range) (S12).

When the calculation of transmission correction coefficients over the entire band is completed (S12), the transmission correction coefficients are stored in the transmission correction coefficient memory 42 (S13). The control part CONT then returns to the processing step S2 to determine whether or not the transmission part TR has been corrected.

In the case where the transmission part TR has been corrected, BB training signals TRS of the entire band are read out of the training signal memory 41 at once (S14). The reception local frequency of the local oscillator LO2 is also changed to the same frequency as that of the local oscillator LO1 (S15).

In the digital modulation unit BMOD, the transmission correction coefficients of the entire band from the transmission correction coefficient memory 42 are used to correct the BB training signals TRS of the entire band (S16), and the corrected BB training signals TRS are put through OFDM modulation (S17). The quadrature modulation unit QMOD performs direct quadrature demodulation to generate transmission RF signals (S18).

The transmission RF signals are fed back to the reception part REC (S19), and converted in the quadrature demodulation unit QDEM into BB signals (S20). The BB training signals TRS undergo OFDM demodulation in the digital demodulation unit BDEM (S21).

The correction coefficient calculation unit 45 then calculates reception correction coefficients for correcting the IQ imbalance of the reception part REC over the entire band (S22). The reception correction coefficients calculated over the entire band are stored in the reception correction coefficient memory 43 (S23), at which point the IQ imbalance correction processing is ended. When it is determined in the processing step S1 that IQ imbalance correction coefficients have been obtained for the transmission part TR and the reception part REC, correction processing is performed on transmission signals and reception signals that are used in normal communications.

[First IQ Imbalance Correction Processing]

In first IQ imbalance correction processing, RF training signals TRS prepared are those that can be divided into four sections on the frequency axis as illustrated in the frequency assignment of FIG. 6. Used here are two training signals (a training signal (1)-USB and a training signal (1)-LSB) TRS that are two central blocks placed to the immediate left and right of the center frequency Fc on the frequency axis, and two training signals (the training signal (2)-USB and the training signal (2)-LSB) TRS that are two outer blocks placed to the distant left and right of the center frequency Fc on the frequency axis. These training signals TRS constitute four blocks that divide an entire band B into four equal sections. The two training signals TRS that are the two central blocks and the two training signals TRS that are the two outer blocks each have the same partial band, that is, B1/2 and B2/2, respectively, in relation to the entire band (bandwidth) B (B=B1+B2, B1≈B2). These training signals TRS are not limited to a particular transmission order. However, the central training signals TRS which form a pair with each other need to be transmitted together, and the outer training signals TRS which form a pair with each other need to be transmitted together.

[Processing Step 1-1]

First, the transmission part TR transmits together one pair of RF training signals (training signals (1): p1) TRS that correspond to a half of the band B (Fc−B/4 to Fc+B/4) and border the center frequency Fc as illustrated in FIG. 7. These RF training signals TRS are affected by IQ imbalance in the transmission part TR, and then received by the reception part REC via the feedback path FB, which includes the feedback switch FB-SW.

The local oscillator LO2 of the reception part REC oscillates at the frequency Fz (Fz=Fc−B/4), which is shifted from the center frequency Fc by a given amount, specifically, B/4, so that all the signals received (the USB training signal TRS and the LSB training signal TRS of FIG. 7) fall within the reception bandwidth L of LPF.

Figure 8:
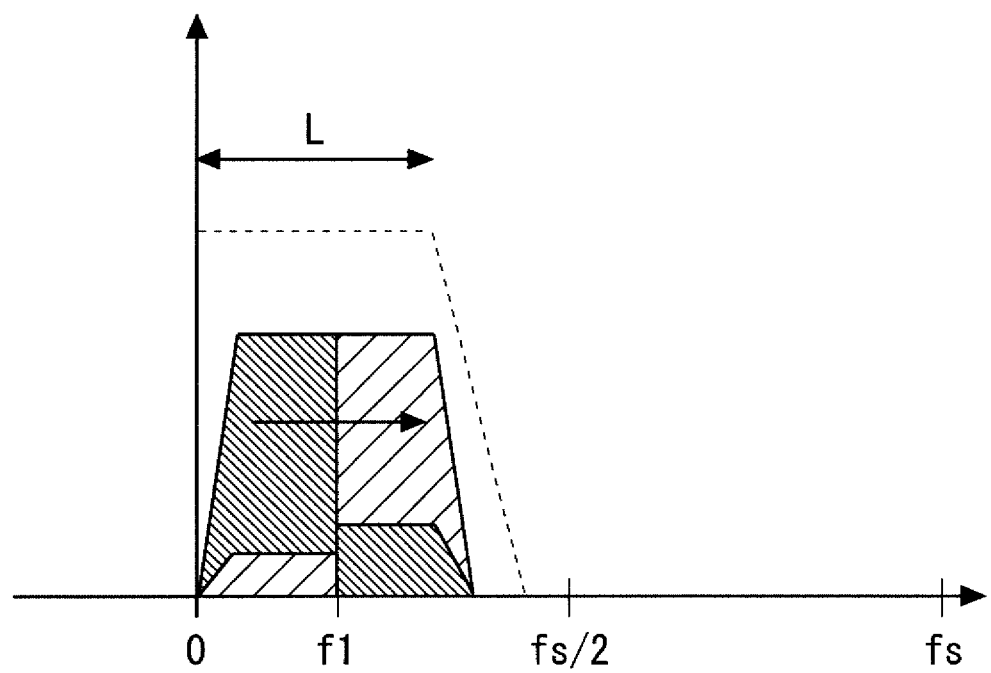
FIG. 8 is a diagram illustrating training signals in the first IQ imbalance correction processing.

This way, frequency conversion in the quadrature demodulation unit QDEM turns the reception RF training signals TRS into IF training signals TRS having the center frequency f1 at B/4 and a bandwidth of B/2 as illustrated in FIG. 8. The pass band L of the reception low path filters LPF is common to the one in normal reception processing and, as described above, set such that at least signals in the band B/2 (more desirably, only signals in the band B/2) are allowed to pass. The reception RF training signals TRS therefore fall within the pass band L of the reception low pass filters LPF. The IF training signals (USB signal and LSB signal) TRS output from the reception low pass filters LPF are sampled by IF sampling in the Q channel side A/D converter ADC to be digitized.

The digitized IF training signals TRS undergo quadrature demodulation in the digital quadrature demodulation unit DDEM of the digital area. The digital quadrature demodulation unit DDEM then outputs BB training signals TRS. The BB training signals TRS from the digital quadrature demodulation unit DDEM are input to the digital demodulation unit BDEM, where the BB training signals TRS are processed to calculate IQ imbalance correction coefficients.

[Processing Step 1-2]

Figure 9:
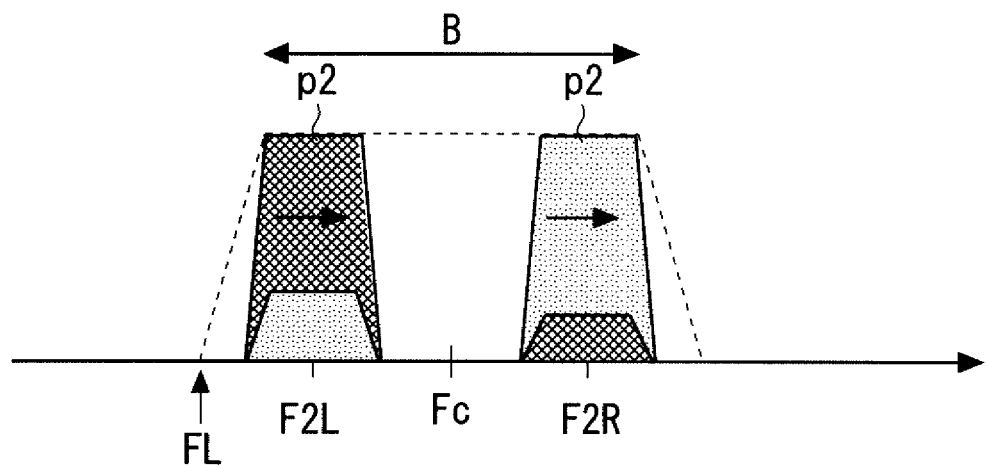
FIG. 9 is a diagram illustrating training signals in the first IQ imbalance correction processing.

Next, the transmission part TR transmits together the RF training signals (training signals (2): p2) that are the two outer blocks as illustrated in FIG. 9. These training signals TRS are affected by IQ imbalance in the transmission part TR, and then received by the reception part REC via the feedback path FB.

Frequency conversion by the quadrature demodulation unit QDEM puts one of the training signals TRS of FIG. 9 inside the reception bandwidth L of LPF and puts the other of the training signals TRS of FIG. 9 outside the reception bandwidth L of LPF. This is accomplished by setting the oscillation frequency FL of the local oscillator LO2 in the reception part REC to a frequency that is shifted from the center frequency Fc by −B/2−B/4+B/8. The control part CONT controls the local oscillator LO2 in advance so that the oscillation frequency FL has a relation expressed as FL=Fc−B/2−B/4+B/8.

Figure 10:
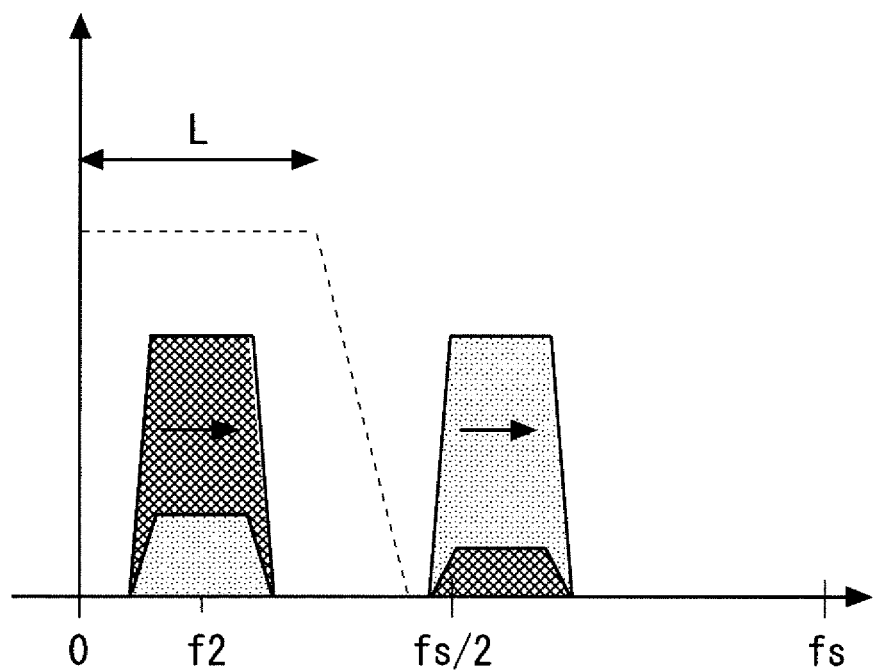
FIG. 10 is a diagram illustrating training signals in the first IQ imbalance correction processing.

Thus, as illustrated in FIG. 10, one of the two blocks of IF training signals (p2) TRS (LSB training signal TRS of FIG. 9) is turned into a signal that has the center frequency f2 at B/4 and a bandwidth of B/4 and that falls within the pass band L of the reception low pass filters LPF, whereas the other (USB training signal TRS of FIG. 9) is turned into a signal whose left edge is at a frequency of 7/8×B outside the pass band L (L≈B/2<7/8×B) of the reception low pass filters LPF, and therefore is sufficiently cut off by the reception low pass filters LPF. The IF training signal (LSB) TRS output from the associated reception low pass filter LPF is sampled by IF sampling in the Q channel side A/D converter ADC to be digitized.

The digitized IF training signal TRS undergoes quadrature demodulation in the digital quadrature demodulation unit DDEM. The digital quadrature demodulation unit DDEM then outputs a BB training signal TRS. The BB training signal TRS from the digital quadrature demodulation unit DDEM is input to the digital demodulation unit BDEM, where the BB training signal TRS is processed to calculate an IQ imbalance correction coefficient.

[Processing Step 1-3]

Subsequently, the transmission part TR transmits together the same training signals TRS as those in the processing step 1-2, specifically, one pair of RF training signals (p2) TRS that are the two outer blocks, as illustrated in FIG. 11. These RF training signals TRS are affected by IQ imbalance in the transmission part TR, and then received by the reception part REC via the feedback path FB.

The oscillation frequency FU of the local oscillator LO2 in the reception part REC is set to a frequency shifted from the center frequency Fc by +B/2+B/4−B/8 (see FIG. 12) so that frequency conversion in the quadrature demodulation unit QDEM causes the resultant IF training signals TRS forming a pair to switch places with each other on the frequency axis. The control part CONT controls the local oscillator LO2 in advance to give the oscillation frequency FU a relation expressed as FU=Fc+B/2+B/4−B/8.

Figure 12:
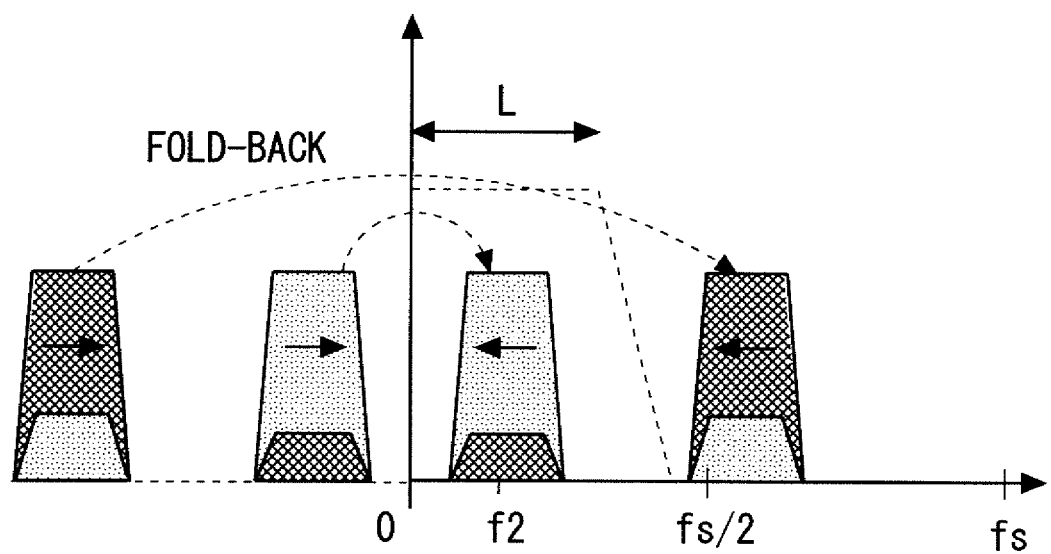
FIG. 12 is a diagram illustrating training signals in the first IQ imbalance correction processing.

Because of the well known feature of the A/D converters ADC, this processing causes the IF training signals TRS obtained by the frequency conversion to fold back symmetrically with respect to the DC (direct current) component as illustrated in signal assignment of FIG. 12. Though a specific description is not given here, the digital quadrature demodulation unit DDEM which performs quadrature demodulation on the IF training signals TRS executes processing that takes this fold-back into account.

This way, as in the processing step 1-2, one of the two blocks of IF training signals (p2) TRS (USB training signal TRS of FIG. 11) falls within the pass band L of the reception low pass filters LPF and the other (LSB training signal TRS of FIG. 11) is cut off by the reception low pass filters LPF as illustrated in FIG. 12. The IF training signal (USB) TRS output from the associated reception low pass filter LPF is sampled by IF sampling in the Q channel side A/D converter ADC to be digitized.

The digitized IF training signal TRS undergoes quadrature demodulation in the digital quadrature demodulation unit DDEM. The digital quadrature demodulation unit DDEM then outputs a BB training signal TRS. The BB training signal TRS from the digital quadrature demodulation unit DDEM is input to the digital demodulation unit BDEM, where the BB training signal TRS is processed to calculate an IQ imbalance correction coefficient.

[Processing Step 1-4]

Next, the correction coefficient calculation unit 45 combines the data stored in the waveform memory 44 in the processing steps 1-2 and 1-3, and processes the combined data to calculate IQ imbalance correction coefficients in the same manner that is used in the processing step 1-1.

The correction coefficients calculated in the processing steps 1-1 to 1-4 are each for a different frequency range. Therefore, the correction coefficient calculation unit 45 in the digital area adds those correction coefficients together to obtain a correction coefficient for the entire frequency range. The calculated transmission correction coefficient is used to correct the IQ imbalance of the transmission part TR.

After the IQ imbalance of the transmission part TR is corrected, the two pairs of RF training signals TRS of FIG. 6 are transmitted at once as frequency domain signals from the transmission part TR, and received by the reception part REC via the feedback path FB. At this point, the local oscillator LO2 of the reception part REC is set under control of the control part CONT to a normal oscillation frequency, namely, the same frequency as that of the local oscillator LO1 of the transmission part TR. The quadrature demodulation unit QDEM then performs direct quadrature demodulation.

In short, the two pairs of RF training signals TRS received from the transmission part TR are affected only by the IQ imbalance of the quadrature demodulation unit QDEM before put through frequency conversion. The BB training signals TRS obtained by the frequency conversion are processed in the same manner by the digital demodulation unit BDEM to calculate an IQ imbalance correction coefficient. The calculated IQ imbalance correction coefficient is a coefficient for correcting the reception side IQ imbalance, and is used to correct the IQ imbalance of the reception part REC.

As has been described, in the first IQ imbalance correction processing, RF training signals TRS symmetric with respect to the center frequency on the frequency axis are paired with each other to transmit a plurality of pairs of RF training signals TRS in installments, and the pairs of RF training signals TRS transmitted in installments are received in pairs to be respectively converted into IF training signals TRS. For this conversion, the reception local frequency is set to change to a suitable frequency each time the need arises. The IF training signals TRS obtained by A/D conversion are respectively put through quadrature demodulation in the digital circuit area to generate BB training signals TRS. The generated BB training signals TRS are respectively demodulated in the digital circuit area, at which point, correction coefficients for correcting IQ imbalance are calculated. A correction coefficient for the entire frequency range is used to correct the IQ imbalance of the transmission part TR including a quadrature modulation function, and then the IQ imbalance of the reception part REC including a quadrature demodulation function is corrected.

According to the first IQ imbalance correction processing, IQ imbalance correction coefficients can be calculated without doubling the conversion speed of the A/D converters ADC of the reception function part 30, in other words, without needing the A/D converters ADC to have a higher conversion speed than necessary for normal communication. This eliminates the need to speed up the A/D converters ADC, change the low pass filters LPF, and the like just for IQ imbalance correction, and prevents the components in the analog circuit area from increasing in hardware scale.

[Second IQ Imbalance Correction Processing]

Figure 13:
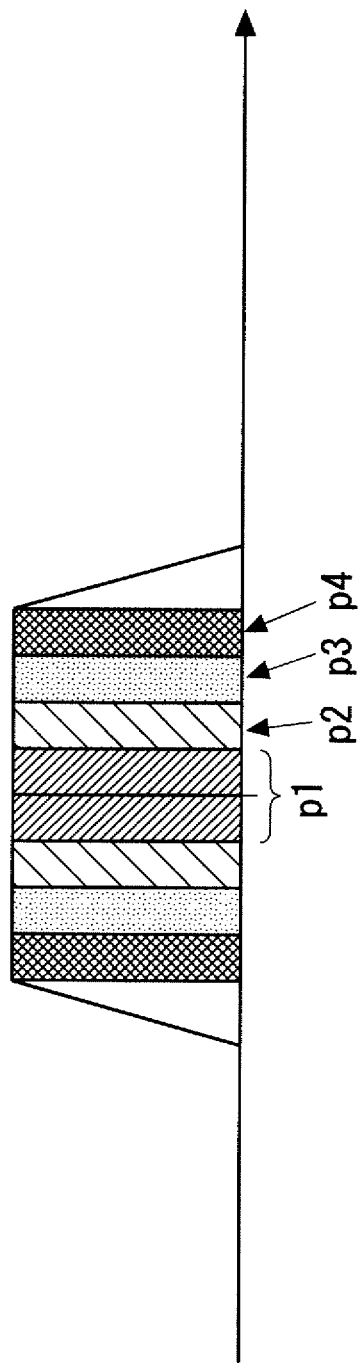
FIG. 13 is a diagram illustrating training signals in second IQ imbalance correction processing.

In second IQ imbalance correction processing, RF training signals TRS are divided into block pairs p1, p2, p3, and p4, which are constituted of eight equal sized blocks on the frequency axis as illustrated in frequency assignment of FIG. 13. The second IQ imbalance correction processing thus uses training signals TRS divided into four pairs.

[Processing Step 2-1]

First, the transmission part TR transmits together one pair of RF training signals (training signals (1): p1) TRS that correspond to ¼ of the band B (Fc−B/8 to Fc+B/8) and border the center frequency Fc as illustrated in FIG. 14(A). These RF training signals TRS are affected by IQ imbalance in the transmission part TR, and then received by the reception part REC via the feedback path FB, which includes the feedback switch FB-SW.

The local oscillator LO2 of the reception part REC oscillates at a frequency FA1 (FA1=Fc−B/8), which is shifted from the center frequency Fc by a given amount, specifically, −B/8, so that all the signals received (the USB training signal TRS and the LSB training signal TRS of FIG. 14(A)) fall within the reception bandwidth L of LPF.

This way, frequency conversion in the quadrature demodulation unit QDEM turns the reception RF training signals TRS into IF training signals TRS having the center frequency f1 at B/8 and a bandwidth of B/4 as illustrated in FIG. 14(B). The reception RF training signals TRS therefore fall within the pass band L of the reception low pass filters LPF. The IF training signals (USB signal and LSB signal) TRS output from the reception low pass filters LPF are sampled by IF sampling in the Q channel side A/D converter ADC to be digitized.

The digitized IF training signals TRS undergo quadrature demodulation in the digital quadrature demodulation unit DDEM. The digital quadrature demodulation unit DDEM then outputs BB training signals TRS. The BB training signals TRS from the digital quadrature demodulation unit DDEM are input to the digital demodulation unit BDEM, where the BB training signals TRS are processed to calculate IQ imbalance correction coefficients. Hereinafter, this processing step is described briefly unless a specific description thereof is necessary.

[Processing Step 2-2]

Next, the transmission part TR transmits together two blocks of RF training signals (training signals (2): p2) TRS that are the second from the innermost block pair as illustrated in FIG. 15(A). This pair of RF training signals TRS are affected by IQ imbalance in the transmission part TR, and then received by the reception part REC via the feedback path FB.

An oscillation frequency FA2 of the local oscillator LO2 in the reception part REC is set to a frequency shifted from the center frequency Fc by −B/4 so that frequency conversion in the quadrature demodulation unit QDEM puts the two blocks of IF training signals TRS of FIG. 15(A) inside the reception bandwidth L of LPF. The control part CONT controls the local oscillator LO2 in advance to give the oscillation frequency FA2 a relation expressed as FA2=Fc−B/4.

Thus, as illustrated in FIG. 15(B), the two blocks of IF training signals (p2) TRS are turned into signals that have the center frequency f2 at B/4 and a bandwidth of B/2 and that fall within the reception bandwidth L of the reception low pass filters LPF. The IF training signals (USB signal and LSB signal) TRS output from the reception low pass filters LPF are sampled by IF sampling in the Q channel side A/D converter ADC to be digitized. Subsequently, the same processing as the above-mentioned processing step 2-1 is executed.

[Processing Step 2-3-1]

Figure 16:
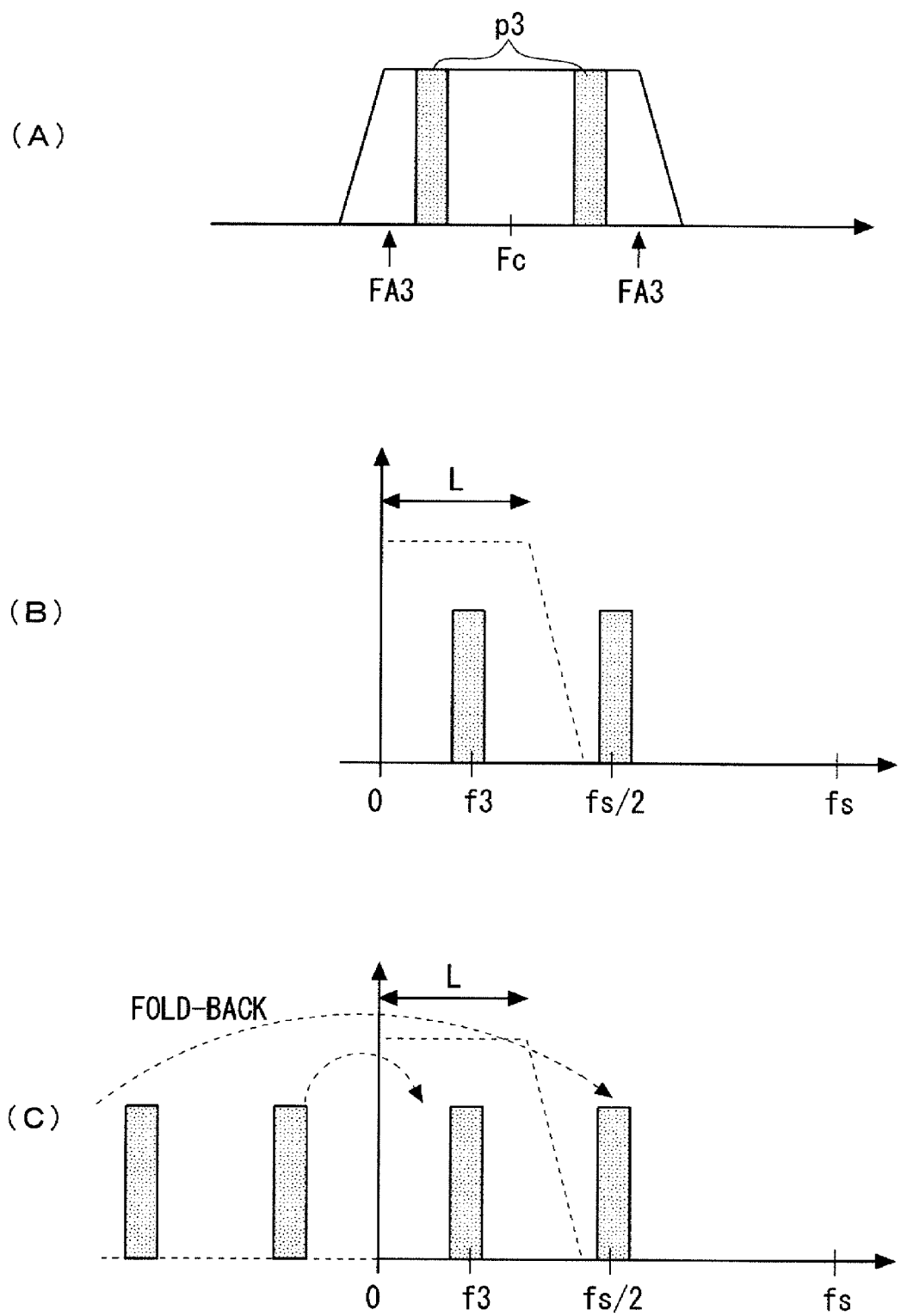
FIG. 16 is a diagram illustrating training signals in the second IQ imbalance correction processing.

Next, the transmission part TR transmits together two blocks of RF training signals (training signals (3): p3) TRS that are the third from the innermost block pair as illustrated in FIG. 16. This pair of RF training signals TRS are affected by IQ imbalance in the transmission part TR, and then received by the reception part REC via the feedback path FB.

Frequency conversion by the quadrature demodulation unit QDEM puts one of the two blocks of training signals TRS of FIG. 16(A) inside the reception bandwidth L of LPF and puts the other of the two blocks of training signals TRS of FIG. 16(A) outside the reception bandwidth L of LPF. This is accomplished by setting an oscillation frequency FA3 of the local oscillator LO2 in the reception part REC to a frequency that is shifted from the center frequency Fc by $-3/8 \times B - B/4 + B/16$. The control part CONT controls the local oscillator LO2 in advance so that the oscillation frequency FA3 has a relation expressed as $FA3 = Fc - 3/8 \times B - B/4 + B/16$.

Thus, as illustrated in FIG. 16(B), one of the IF training signals (p3) TRS (LSB training signal TRS of FIG. 16(A)) is turned into a signal that has a center frequency f3 at B/4 and a bandwidth of B/8 and that falls within the pass band L of the reception low pass filters LPF, whereas the other of the IF training signals (p3) TRS (USB training signal TRS of FIG. 16(A)) is turned into a signal whose left edge is at a frequency of $13/16 \times B$ outside the pass band L ($LB/2 < 13/16 \times B$) of the reception low pass filters LPF, and therefore is cut off by the reception low pass filters LPF. The IF training signal (LSB) TRS output from the associated reception low pass filter LPF is sampled by IF sampling in the Q channel side A/D converter ADC to be digitized. Subsequently, the same processing as the above-mentioned processing step 2-1 is executed.

[Processing Step 2-3-2]

Subsequently, the transmission part TR transmits together the same training signals (p3) TRS as those in the processing step 2-3-1. This pair of RF training signals TRS are affected by IQ imbalance in the transmission part TR, and then received by the reception part REC via the feedback path FB.

The oscillation frequency FA3 of the local oscillator LO2 in the reception part REC is set to a frequency shifted from the center frequency Fc by $+3/8 \times B + B/4 - B/16$ (see FIG. 16(A)) so that frequency conversion in the quadrature demodulation unit QDEM causes the resultant IF training signals TRS forming a pair to switch places with each other on the frequency axis. The control part CONT controls the local oscillator LO2 in advance to give the oscillation frequency FA3 a relation expressed as $FA3 = Fc + 3/8 \times B + B/4 - B/16$. The signal arrangement of the folded back IF training signals TRS is illustrated in FIG. 16(C).

Thus, as illustrated in FIG. 16(C), one of the two blocks of IF training signals (p3) TRS (USB training signal TRS of FIG. 16(A)) is turned into a signal that has the center frequency f3 at B/4 and a bandwidth of B/8 and that falls within the pass band L of the reception low pass filters LPF, whereas the other of the two blocks of IF training signals (p3) TRS (LSB training signal TRS of FIG. 16(A)) is turned into a signal whose left edge is at a frequency of $13/16 \times B$ outside the pass band L ($L \approx B/2 < 13/16 \times B$) of the reception low pass filters LPF, and therefore is cut off by the reception low pass filters LPF. The IF training signal (USB) TRS output from the associated reception low pass filter LPF is sampled by IF sampling in the Q channel side A/D converter ADC to be digitized. Subsequently, the same processing as the above-mentioned processing step 2-1 is executed.

[Processing Step 2-3-3]

Next, the correction coefficient calculation unit 45 combines the data stored in the waveform memory 44 in the processing steps 2-3-1 and 2-3-2, and processes the combined data to calculate IQ imbalance correction coefficients in the same manner that is used in the processing step 2-1.

[Processing Step 2-4-1]

Next, the transmission part TR transmits together two blocks of RF training signals (training signals (4): p4) TRS that are the fourth from innermost block pair as illustrated in FIG. 17(A). These RF training signals (p4) TRS are affected by IQ imbalance in the transmission part TR, and then received by the reception part REC via the feedback path FB.

Frequency conversion by the quadrature demodulation unit QDEM puts one of the two blocks of training signals TRS of FIG. 17(A) inside the reception bandwidth L of LPF and puts the other of the two blocks of training signals TRS of FIG. 17(A) outside the reception bandwidth L of LPF. This is accomplished by setting an oscillation frequency FA4 of the local oscillator LO2 in the reception part REC to a frequency that is shifted from the center frequency Fc by $-B/2 - B/4 + B/16$. The control part CONT controls the local oscillator LO2 in advance so that the oscillation frequency FA4 has a relation expressed as $FA4 = Fc - B/2 - B/4 + B/16$.

Thus, as illustrated in FIG. 17(B), one of the pair of IF training signals (p4) TRS (LSB training signal TRS of FIG. 17(B)) is turned into a signal that has a center frequency f4 at B/4 and a bandwidth of B/8 and that falls within the pass band L of the reception low pass filters LPF, whereas the other of the pair of IF training signals (p4) TRS (USB training signal TRS of FIG. 17(B)) is turned into a signal whose left edge is at a frequency of $17/16 \times B$ outside the pass band L ($L \approx B/2 < 17/16 \times B$) of the reception low pass filters LPF, and therefore is cut off by the reception low pass filters LPF. The IF training signal (LSB) TRS output from the associated reception low pass filter LPF is sampled by IF sampling in the Q channel side A/D converter ADC to be digitized. Subsequently, the same processing as the above-mentioned processing step 2-1 is executed.

[Processing Step 2-4-2]

Next, the transmission part TR transmits together the same pair of training signals (p4) TRS as the pair in the processing step 2-4-1. These RF training signals TRS are affected by IQ imbalance in the transmission part TR, and then received by the reception part REC via the feedback path FB.

The oscillation frequency FA4 of the local oscillator LO2 in the reception part REC is set to a frequency shifted from the center frequency Fc by $+B/2 + B/4 - B/16$ (see FIG. 17(C)) so that frequency conversion in the quadrature demodulation unit QDEM causes the resultant IF training signals TRS forming a pair to switch places with each other on the frequency axis. The control part CONT controls the local oscillator LO2 in advance to give the oscillation frequency FA4 a relation expressed as $FA4 = Fc + B/2 + B/4 - B/16$. The signal arrangement of the folded back IF training signals TRS is illustrated in FIG. 17(C).

Thus, as illustrated in FIG. 17(C), one of the two blocks of IF training signals (p4) TRS (USB training signal TRS of FIG. 17(A)) is turned into a signal that has the center frequency f4 at B/4 and a bandwidth of B/8 and that falls within the pass band L of the reception low pass filters LPF, whereas the other of the two blocks of IF training signals (p4) TRS (LSB training signal TRS of FIG. 17(A)) is turned into a signal whose left edge is at a frequency of $17/16 \times B$ outside the pass band L ($L \approx B/2 < 17/16 \times B$) of the reception low pass filters LPF, and therefore is cut off by the reception low pass filters LPF. The IF training signal (USB) TRS output from the associated reception low pass filter LPF is sampled by IF sampling in the Q channel side A/D converter ADC to be digitized. Subsequently, the same processing as the above-mentioned processing step 2-1 is executed.

[Processing Step 2-4-3]

Next, the correction coefficient calculation unit 45 combines the data stored in the waveform memory 44 in the processing steps 2-4-1 and 2-4-2, and processes the combined data to calculate IQ imbalance correction coefficients in the same manner that is used in the processing step 2-1.

The correction coefficients calculated in the processing steps 2-1 to 2-4-3 are each for a different frequency range. Therefore, the correction coefficient calculation unit 45 in the digital area adds those correction coefficients together to obtain a correction coefficient for the entire frequency range. The calculated transmission correction coefficient is used to correct the IQ imbalance of the transmission part TR.

After the IQ imbalance of the transmission part TR is corrected, the four pairs of RF training signals (p1, p2, p3, and p4) TRS of FIG. 13 are transmitted at once as frequency domain signals from the transmission part TR, and received by the reception part REC via the feedback path FB. At this point, the local oscillator LO2 of the reception part REC is set under control of the control part CONT to a normal oscillation frequency, namely, the same frequency as that of the local oscillator LO1 of the transmission part TR. The quadrature demodulation unit QDEM then performs direct quadrature demodulation.

In short, the four pairs of RF training signals TRS received from the transmission part TR are affected by the IQ imbalance of the quadrature demodulation unit QDEM before put through frequency conversion. The BB training signals TRS obtained by the frequency conversion are processed in the same manner by the digital demodulation unit BDEM to calculate an IQ imbalance correction coefficient. The calculated reception correction coefficient is used to correct the IQ imbalance of the reception part REC.

According to the second IQ imbalance correction processing, the same effects as those of the above-mentioned first IQ imbalance correction processing are expected.

[Third IQ Imbalance Correction Processing]

Figure 18:
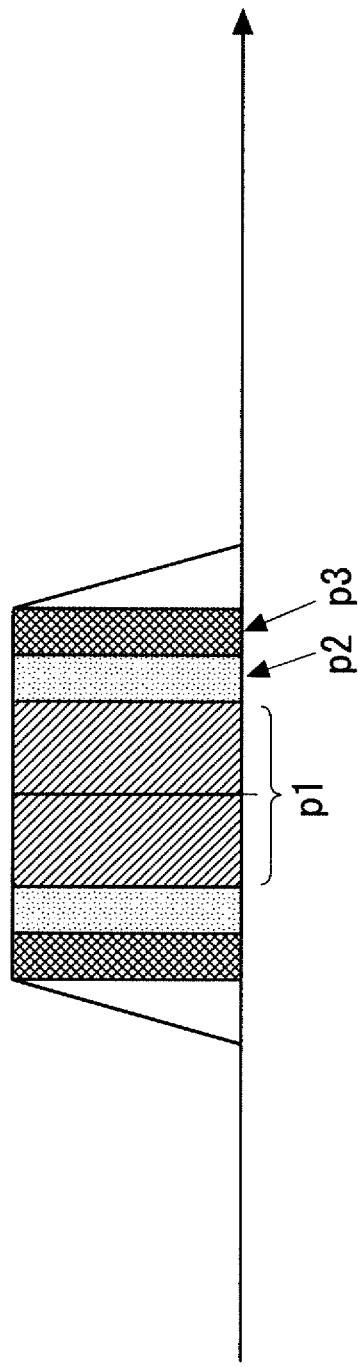
FIG. 18 is a diagram illustrating training signals in third IQ imbalance correction processing.

In third IQ imbalance correction processing, RF training signals TRS are divided into block pairs p1, p2, and p3, which have unequal bandwidths on the frequency axis as illustrated in frequency assignment of FIG. 18. The third IQ imbalance correction processing thus uses training signals TRS divided into three pairs.

[Processing Step 3-1]

First, the transmission part TR transmits together one pair of RF training signals (training signals (1): p1) TRS that correspond to a half of the band B (Fc−B/4 to Fc+B/4) and border the center frequency Fc as illustrated in FIG. 19(A). These RF training signals TRS are affected by IQ imbalance in the transmission part TR, and then received by the reception part REC via the feedback path FB, which includes the feedback switch FB-SW.

The local oscillator LO2 of the reception part REC oscillates at a frequency FB1 (FB1=Fc−B/4), which is shifted from the center frequency Fc by a given amount, specifically, −B/4, so that all the signals received (USB training signal TRS and LSB training signal TRS of FIG. 19(A)) fall within the reception bandwidth L of LPF.

This way, frequency conversion in the quadrature demodulation unit QDEM turns the reception RF training signals TRS into signals having the center frequency f1 at B/4 and a bandwidth of B/2 as illustrated in FIG. 19(B). The reception RF training signals TRS therefore fall within the pass band L of the reception low pass filters LPF. The IF training signals (USB signal and LSB signal) TRS output from the reception low pass filters LPF are sampled by IF sampling in the Q channel side A/D converter ADC to be digitized.

The digitized IF training signals TRS undergo quadrature demodulation in the digital quadrature demodulation unit DDEM. The digital quadrature demodulation unit DDEM then outputs BB training signals TRS. The BB training signals TRS from the digital quadrature demodulation unit DDEM are input to the digital demodulation unit BDEM, where the BB training signals TRS are processed to calculate IQ imbalance correction coefficients. Hereinafter, this processing step is described briefly unless a specific description thereof is necessary.

[Processing Step 3-2-1]

Figure 20:
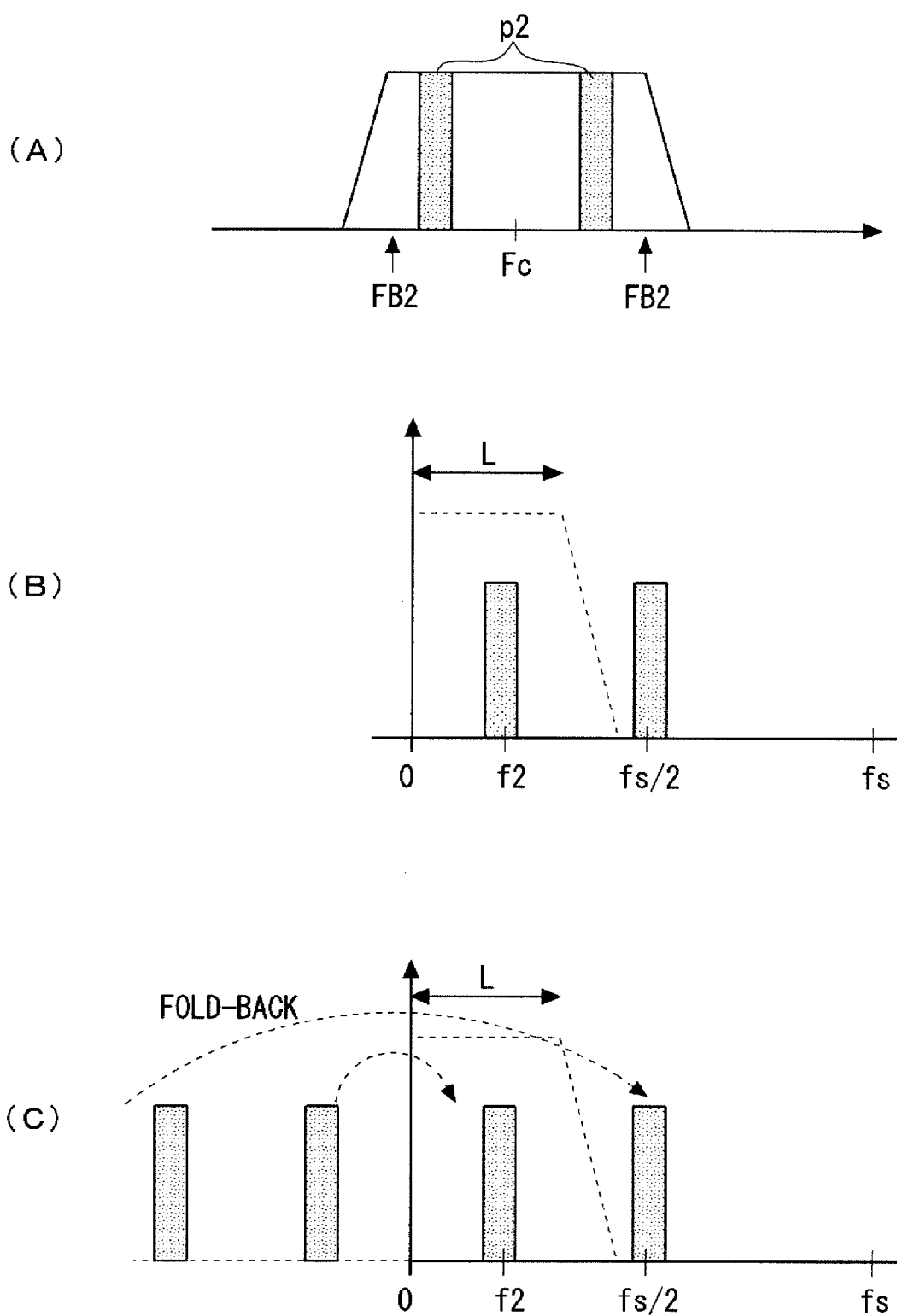
FIG. 20 is a diagram illustrating training signals in the third IQ imbalance correction processing.

Next, the transmission part TR transmits together two blocks of RF training signals (training signals (2): p2) TRS that are the second from the innermost block pair as illustrated in FIG. 20(A). This pair of RF training signals TRS are affected by IQ imbalance in the transmission part TR, and then received by the reception part REC via the feedback path FB.

Frequency conversion by the quadrature demodulation unit QDEM puts one of the two blocks of training signals TRS of FIG. 20(A) inside the reception bandwidth L of LPF and puts the other of the two blocks of training signals TRS of FIG. 20(A) outside the reception bandwidth L of LPF. This is accomplished by setting an oscillation frequency FB2 of the local oscillator LO2 in the reception part REC to a frequency that is shifted from the center frequency Fc by $-\frac{3}{8} \times B - B/4 + B/16$ The control part CONT controls the local oscillator LO2 in advance so that the oscillation frequency FB2 has a relation expressed as FB2=Fc−$\frac{3}{8}$×B−B/4+B/16.

Thus, as illustrated in FIG. 20(B), one of the IF training signals (p2) TRS (LSB training signal TRS of FIG. 20(A)) is turned into a signal that has the center frequency f2 at B/4 and a bandwidth of B/8 and that falls within the pass band L of the reception low pass filters LPF, whereas the other of the IF training signals (p2) TRS (USB training signal TRS of FIG. 20(A)) is turned into a signal whose left edge is at a frequency of $^{13}/_{16}$×B outside the pass band L (L≈B/2<$^{13}/_{16}$×B) of the reception low pass filters LPF, and therefore is cut off by the reception low pass filters LPF. The IF training signal (LSB) TRS output from the associated reception low pass filter LPF is sampled by IF sampling in the Q channel side A/D converter ADC to be digitized. Subsequently, the same processing as the above-mentioned processing step 3-1 is executed.

[Processing Step 3-2-2]

Next, the transmission part TR transmits together the same RF training signals (p2) TRS as those in the processing step 3-2-1. This pair of RF training signals TRS are affected by IQ imbalance in the transmission part TR, and then received by the reception part REC via the feedback path FB.

The oscillation frequency FB2 of the local oscillator LO2 in the reception part REC is set to a frequency shifted from the center frequency Fc by −$\frac{3}{8}$×B+B/4−B/16 (see FIG. 20(C)) so that frequency conversion in the quadrature demodulation unit QDEM causes the resultant IF training signals TRS forming a pair to switch places with each other on the frequency axis. The control part CONT controls the local oscillator LO2 in advance to give the oscillation frequency FB2 a relation expressed as FB2=Fc−$\frac{3}{8}$×B+B/4−B/16. The signal arrangement of the folded back IF training signals TRS is illustrated in FIG. 20(C).

Thus, as illustrated in FIG. 20(C), one of the two blocks of IF training signals (p2) TRS (USB training signal TRS of FIG. 20(A)) is turned into a signal that has the center frequency f2 at B/4 and a bandwidth of B/8 and that falls within the pass band L of the reception low pass filters LPF, whereas the other of the two blocks of IF training signals (p2) TRS (LSB training signal TRS of FIG. 20(A)) is turned into a signal whose left edge is at a frequency of $^{13}/_{16} \times B$ outside the pass band L (L≈B/2<$^{13}/_{16} \times B$) of the reception low pass filters LPF, and therefore is cut off by the reception low pass filters LPF. The IF training signal (USB) TRS output from the associated reception low pass filter LPF is sampled by IF sampling in the Q channel side A/D converter ADC to be digitized. Subsequently, the same processing as the above-mentioned processing step 3-1 is executed.

[Processing Step 3-2-3]

Next, the correction coefficient calculation unit 45 combines the data stored in the waveform memory 44 in the processing steps 3-2-1 and 3-2-2, and processes the combined data to calculate IQ imbalance correction coefficients in the same manner that is used in the processing step 3-1.

[Processing Step 3-3-1]

Next, the transmission part TR transmits together two blocks of the RF training signals (training signals (3): p3) TRS that are the third from the innermost block pair as illustrated in FIG. 21(A). This pair of RF training signals TRS are affected by IQ imbalance in the transmission part TR, and then received by the reception part REC via the feedback path FB.

Frequency conversion by the quadrature demodulation unit QDEM puts one of the two blocks of training signals TRS that are the third from the innermost block pair of FIG. 21(A) inside the reception bandwidth L of LPF and puts the other of the two blocks of training signals TRS of FIG. 21(A) outside the reception bandwidth L of LPF. This is accomplished by setting an oscillation frequency FB3 of the local oscillator LO2 in the reception part REC to a frequency that is shifted from the center frequency Fc by −B/2−B/4+B/16. The control part CONT controls the local oscillator LO2 in advance so that the oscillation frequency FB3 has a relation expressed as FB3=Fc−B/2−B/4+B/16.

Thus, as illustrated in FIG. 21(B), one of the IF training signals (p3) TRS (LSB training signal TRS of FIG. 21(A)) is turned into a signal that has the center frequency f3 at B/4 and a bandwidth of B/8 and that falls within the pass band L of the reception low pass filters LPF, whereas the other of the IF training signals (p3) TRS (USB training signal TRS of FIG. 21(A)) is turned into a signal whose left edge is at a frequency of $^{17}/_{16} \times B$ outside the pass band L (L≈B/2<$^{17}/_{16} \times B$) of the reception low pass filters LPF, and therefore is cut off by the reception low pass filters LPF. The IF training signal (LSB) TRS output from the associated reception low pass filter LPF is sampled by IF sampling in the Q channel side A/D converter ADC to be digitized. Subsequently, the same processing as the above-mentioned processing step 3-1 is executed.

[Processing Step 3-3-2]

Next, the transmission part TR transmits together the same RF training signals (p3) TRS as those in the processing step 3-3-1. This pair of RF training signals TRS are affected by IQ imbalance in the transmission part TR, and then received by the reception part REC via the feedback path FB.

The oscillation frequency FB3 of the local oscillator LO2 in the reception part REC is set to a frequency shifted from the center frequency Fc by +B/2+B/4−B/16 (see FIG. 21(C)) so that frequency conversion in the quadrature demodulation unit QDEM causes the resultant IF training signals TRS forming a pair to switch places with each other on the frequency axis. The control part CONT controls the local oscillator LO2 in advance to give the oscillation frequency FB3 a relation expressed as FB3=Fc+B/2+B/4−B/16. The signal arrangement of the folded back IF training signals TRS is illustrated in FIG. 21(C).

Thus, as illustrated in FIG. 21(C), one of the two blocks of IF training signals (p3) TRS (USB training signal TRS of FIG. 21(A)) is turned into a signal that has the center frequency f3 at B/4 and a bandwidth of B/8 and that falls within the pass band L of the reception low pass filters LPF, whereas the other of the two blocks of IF training signals (p3) TRS (LSB training signal TRS of FIG. 21(A)) is turned into a signal whose left edge is at a frequency of $^{17}/_{16} \times B$ outside the pass band L (L≈B/2<$^{17}/_{16} \times B$) of the reception low pass filters LPF, and therefore is cut off by the reception low pass filters LPF. The IF training signal (USB) TRS output from the associated reception low pass filter LPF is sampled by IF sampling in the Q channel side A/D converter ADC to be digitized. Subsequently, the same processing as the above-mentioned processing step 3-1 is executed.

[Processing Step 3-3-3]

Next, the correction coefficient calculation unit 45 combines the data stored in the waveform memory 44 in the processing steps 3-3-1 and 3-3-2, and processes the combined data to calculate IQ imbalance correction coefficients in the same manner that is used in the processing step 3-1.

The correction coefficients calculated in the processing steps 3-1 to 3-3-3 are each for a different frequency range. Therefore, the correction coefficient calculation unit 45 in the digital area adds those correction coefficients together to obtain a correction coefficient for the entire frequency range. The calculated transmission correction coefficient is used to correct the IQ imbalance of the transmission part TR.

After the IQ imbalance of the transmission part TR is corrected, the three pairs of RF training signals (p1, p2, and p3) TRS of FIG. 18 are transmitted at once as frequency domain signals from the transmission part TR, and received by the reception part REC via the feedback path FB. At this point, the local oscillator LO2 of the reception part REC is set under control of the control part CONT to a normal oscillation frequency, namely, the same frequency as that of the local oscillator LO1 of the transmission part TR. The quadrature demodulation unit QDEM then performs direct quadrature demodulation.

In short, the three pairs of RF training signals TRS received from the transmission part TR are affected by the IQ imbalance of the quadrature demodulation unit QDEM before put through frequency conversion. The BB training signals TRS obtained by the frequency conversion are processed in the same manner by the digital demodulation unit BDEM to calculate an IQ imbalance correction coefficient. The calculated reception correction coefficient is used to correct the IQ imbalance of the reception part REC.

How RF training signals TRS are divided unequally into block pairs can be chosen at discretion as long as the resultant frequency relation ensures that IF training signals TRS fall within the reception bandwidth L of LPF in the reception part REC while unnecessary IF training signals TRS are suppressed.

According to the third IQ imbalance correction processing, the same effects as those of the above-mentioned first IQ imbalance correction processing are expected.

[Fourth IQ Imbalance Correction Processing]

In fourth IQ imbalance correction processing, in addition to information on the correction of the IQ imbalance of the transmission part TR, amplitude frequency characteristics in the quadrature modulation unit QMOD can be obtained at the same time if the center frequency Fc is constant among signals put through frequency conversion by the quadrature demodulation unit QDEM. By correcting inverse characteristics of the amplitude frequency characteristics on the transmission side, amplitude frequency deviations can be removed from transmission signals. The frequency of the reception side local oscillator LO2 in this correction processing is adjusted so that signals sampled by IF sampling have the same center frequency f0.

Figure 22:
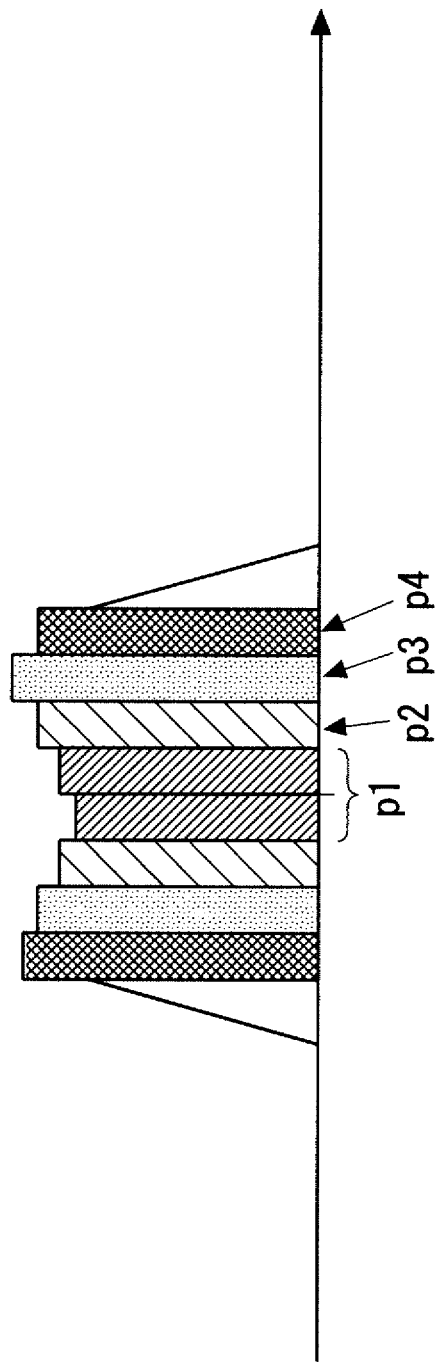
FIG. 22 is a diagram illustrating training signals in fourth IQ imbalance correction processing.

RF training signals TRS in the fourth IQ imbalance correction processing are divided into block pairs p1, p2, p3, and p4, which are constituted of eight equal sized blocks on the frequency axis as illustrated in frequency assignment of FIG. 22. In the case where amplitude frequency characteristics and phase frequency characteristics are present in an RF system from the transmission part TR to the reception part REC, the four pairs of RF training signals TRS have frequency characteristics illustrated in FIG. 22. In this example, the RF training signals TRS have unequal heights due to the influence of the amplitude frequency characteristics.

[Processing Step 4-1-1]

First, the transmission part TR transmits together one pair of RF training signals (training signals (1): p1) TRS that correspond to ¼ of the band B (Fc−B/8 to Fc+B/8) and border the center frequency Fc as illustrated in FIG. 23(A). This pair of RF training signals TRS are affected by IQ imbalance in the transmission part TR, and then received by the reception part REC via the feedback path FB, which includes the feedback switch FB-SW.

The local oscillator LO2 of the reception part REC oscillates at a frequency FC0 (FC0=Fc−B/4−B/8/2), which is shifted from the center frequency Fc by a given amount, so that all the signals received (USB training signal TRS and LSB training signal TRS of FIG. 23(A)) are contained within the reception bandwidth L of LPF, with the center of the left hand side block of the block pair p1 (LSB training signal TRS) positioned at the frequency f0 (f0=B/4).

This way, frequency conversion in the quadrature demodulation unit QDEM causes the reception RF training signals TRS to fall within the pass band L of the reception low pass filters LPF as one pair of IF training signals TRS, as illustrated in FIG. 23(B). The IF training signals (USB signal and LSB signal) TRS output from the reception low pass filters LPF are sampled by IF sampling in the Q channel side A/D converter ADC to be digitized.

The digitized IF training signals (USB signal and LSB signal) TRS undergo quadrature demodulation in the digital quadrature demodulation unit DDEM. The digital quadrature demodulation unit DDEM then outputs BB training signals TRS. The BB training signals TRS from the digital quadrature demodulation unit DDEM are input to the digital demodulation unit BDEM, where the BB training signals TRS are processed to calculate IQ imbalance correction coefficients. Hereinafter, this processing step is described briefly unless a specific description thereof is necessary.

[Processing Step 4-1-2]

Next, the transmission part TR transmits together the same RF training signals (p1) TRS as those in the processing step 4-1-1. This pair of training signals TRS are affected by IQ imbalance in the transmission part TR, and then received by the reception part REC via the feedback path FB.

The oscillation frequency FC0 of the local oscillator LO2 in the reception part REC is set to a frequency shifted from the center frequency Fc by a given amount so that frequency conversion in the quadrature demodulation unit QDEM causes the resultant IF training signals TRS forming a pair to switch places with each other on the frequency axis, with the center of the USB training signals TRS positioned at the frequency f0 (f0=B/4). The control part CONT controls the local oscillator LO2 in advance to give the oscillation frequency FC0 a relation expressed as FC0=Fc+B/4+B/8/2. The signal arrangement of the IF training signals TRS is illustrated in FIG. 23(C).

The two blocks of IF training signals (p1) TRS thus fall within the reception bandwidth L of the reception low pass filters LPF as illustrated in FIG. 23(C). The IF training signals (USB signal and LSB signal) TRS output from the reception low pass filters LPF are sampled by IF sampling in the Q channel side A/D converter ADC to be digitized. Subsequently, the same processing as the above-mentioned processing step 4-1-1 is executed.

[Processing Step 4-1-3]

Next, out of the data stored in the waveform memory 44 in the above-mentioned processing steps 4-1-1 and 4-1-2, the correction coefficient calculation unit 45 retrieves each training signal TRS whose center as an IF signal is at the center frequency f0. The correction coefficient calculation unit 45 combines the retrieved training signals TRS, and then calculates IQ imbalance correction coefficients and the in-band deviation of the one pair of training signals (p1) TRS.

[Processing Step 4-2-1]

Next, the transmission part TR transmits together two blocks of RF training signals (training signals (2): p2) TRS that are the second from the innermost block pair as illustrated in FIG. 24(A). This pair of RF training signals TRS are affected by IQ imbalance in the transmission part TR, and then received by the reception part REC via the feedback path FB.

The local oscillator LO2 of the reception part REC oscillates at a frequency FC1 (FC1=Fc−⅜×B−B/8/2), which is shifted from the center frequency Fc by a given amount, so that all the signals received (USB training signal TRS and LSB training signal TRS of FIG. 24(A)) are contained within the reception bandwidth L of LPF, with the center of the left hand side block of the block pair p2 (LSB training signal TRS) positioned at the frequency f0 (f0=B/4).

This way, frequency conversion in the quadrature demodulation unit QDEM causes the reception RF training signals TRS to fall within the pass band L of the reception low pass filters LPF as one pair of IF training signals, as illustrated in FIG. 24(B). The IF training signals (USB signal and LSB signal) TRS output from the reception low pass filters LPF are sampled by IF sampling in the Q channel side A/D converter ADC to be digitized.

The digitized IF training signals (USB signal and LSB signal) TRS undergo quadrature demodulation in the digital quadrature demodulation unit DDEM. The digital quadrature demodulation unit DDEM then outputs BB training signals TRS. The BB training signals TRS from the digital quadrature demodulation unit DDEM are input to the digital demodulation unit BDEM, where the BB training signals TRS are processed to calculate IQ imbalance correction coefficients.

[Processing Step 4-2-2]

Next, the transmission part TR transmits together the same RF training signals (p2) TRS as those in the processing step 4-2-1. This pair of RF training signals TRS are affected by IQ imbalance in the transmission part TR, and then received by the reception part REC via the feedback path FB.

The oscillation frequency FC1 of the local oscillator LO2 in the reception part REC is set to a frequency shifted from the center frequency Fc by a given amount so that frequency conversion in the quadrature demodulation unit QDEM causes the pair of IF training signals TRS to switch places with each other on the frequency axis, and positions the center of one of the folded back signals at the frequency f0 (f0=B/4). The control part CONT controls the local oscillator LO2 in advance to give the oscillation frequency FC1 a relation expressed as FC1=Fc+⅜×B+B/⁸⁄₂. The signal arrangement of the folded back IF training signals TRS is illustrated in FIG. 24(C).

The two blocks of IF training signals (p2) TRS thus fall within the reception bandwidth L of the reception low pass filters LPF as illustrated in FIG. 24(C). The IF training signals (USB signal and LSB signal) TRS output from the reception low pass filters LPF are sampled by IF sampling in the Q channel side A/D converter ADC to be digitized. Subsequently, the same processing as the above-mentioned processing step 4-2-1 is executed.

[Processing Step 4-2-3]

Next, the correction coefficient calculation unit 45 combines data stored in the waveform memory 44 in the processing steps 4-2-1 and 4-2-2, and then calculates IQ imbalance correction coefficients and the in-band deviation of the one pair of training signals (p2) TRS.

[Processing Step 4-3-1]

Next, the transmission part TR transmits together two blocks of RF training signals (p3) TRS that are the third from the innermost block pair as illustrated in FIG. 25(A). This pair of RF training signals TRS are affected by IQ imbalance in the transmission part TR, and then received by the reception part REC via the feedback path FB.

Frequency conversion by the quadrature demodulation unit QDEM puts one of the two blocks of training signals TRS of FIG. 25(A) inside the reception bandwidth L of LPF, with the center of the left hand side block of the block pair p3 (LSB training signal TRS) positioned at the frequency f0 (f0=B/4), and puts the other training signal TRS outside the reception bandwidth L of LPF. This is accomplished by setting an oscillation frequency FC2 of the local oscillator LO2 in the reception part REC to a frequency that is shifted from the center frequency Fc by a given amount. The control part CONT controls the local oscillator LO2 in advance so that the oscillation frequency FC2 has a relation expressed as FC2=Fc−B/2−B/⁸⁄₂.

This way, one of the IF training signals (p3) TRS (LSB training signal TRS of FIG. 25(A)) falls within the pass band L of the reception low pass filters LPF and the other (USB training signal TRS of FIG. 25(A)) is cut off by the reception low pass filters LPF as illustrated in FIG. 25(B). The IF training signal (LSB) TRS output from the associated reception low pass filter LPF is sampled by IF sampling in the Q channel side A/D converter ADC to be digitized.

The digitized IF training signal (LSB) TRS undergoes quadrature demodulation in the digital quadrature demodulation unit DDEM. The digital quadrature demodulation unit DDEM then outputs a BB training signal TRS. The BB training signal TRS from the digital quadrature demodulation unit DDEM is input to the digital demodulation unit BDEM, where the BB training signal TRS is processed to calculate an IQ imbalance correction coefficient.

[Processing Step 4-3-2]

Next, the transmission part TR transmits together the same RF training signals (p3) TRS as those in the processing step 4-3-1. This pair of RF training signals TRS are affected by IQ imbalance in the transmission part TR, and then received by the reception part REC via the feedback path FB.

The oscillation frequency FC2 of the local oscillator LO2 in the reception part REC is set to a frequency shifted from the center frequency Fc by a given amount so that frequency conversion in the quadrature demodulation unit QDEM causes the pair of IF training signals TRS to switch places with each other on the frequency axis, and positions the center of one of the folded back signals at the frequency f0 (f0=B/4). The control part CONT controls the local oscillator LO2 in advance to give the oscillation frequency FC2 a relation expressed as FC2=Fc+B/2+B/⁸⁄₂. The signal arrangement of the folded back IF training signals TRS is illustrated in FIG. 25(C).

This way, one of the IF training signals (p3) TRS (USB training signal TRS of FIG. 25(A)) falls within the pass band L of the reception low pass filters LPF and the other (LSB training signal TRS of FIG. 25(A)) is cut off by the reception low pass filters LPF as illustrated in FIG. 25(C). The IF training signal (USB) TRS output from the associated reception low pass filter LPF is sampled by IF sampling in the Q channel side A/D converter ADC to be digitized. Subsequently, the same processing as the above-mentioned processing step 4-3-1 is executed.

[Processing Step 4-3-3]

Next, the correction coefficient calculation unit 45 combines data stored in the waveform memory 44 in the processing steps 4-3-1 and 4-3-2, and then calculates IQ imbalance correction coefficients and the in-band deviation of the one pair of training signals (p3) TRS.

[Processing Step 4-4-1]

Next, the transmission part TR transmits together two blocks of RF training signals (p4) TRS that are the fourth from the innermost block pair as illustrated in FIG. 26(A). This pair of RF training signals TRS are affected by IQ imbalance in the transmission part TR, and then received by the reception part REC via the feedback path FB.

Frequency conversion by the quadrature demodulation unit QDEM puts one of the two blocks of training signals TRS of FIG. 26(A) inside the reception bandwidth L of LPF, with the center of the left hand side block of the block pair p4 (LSB training signal TRS) positioned at the frequency f0 (f0=B/4), and puts the other training signal TRS outside the reception bandwidth L of LPF. This is accomplished by setting an oscillation frequency FC3 of the local oscillator LO2 in the reception part REC to a frequency that is shifted from the center frequency Fc by a given amount. The control part CONT controls the local oscillator LO2 in advance so that the oscillation frequency FC3 has a relation expressed as FC3=Fc−⅝×B−B/⁸⁄₂.

This way, one of the two IF training signals (p4) TRS (LSB training signal TRS of FIG. 26(A)) falls within the pass band L of the reception low pass filters LPF and the other (USB training signal TRS of FIG. 26(A)) is cut off by the reception low pass filters LPF as illustrated in FIG. 26(B). The IF training signal (LSB) TRS output from the associated reception low pass filter LPF is sampled by IF sampling in the Q channel side A/D converter ADC to be digitized.

The digitized IF training signal (LSB) TRS undergoes quadrature demodulation in the digital quadrature demodulation unit DDEM. The digital quadrature demodulation unit DDEM then outputs a BB training signal TRS. The BB training signal TRS from the digital quadrature demodulation unit DDEM is input to the digital demodulation unit BDEM, where the BB training signal TRS is processed to calculate an IQ imbalance correction coefficient.

[Processing Step 4-4-2]

Next, the transmission part TR transmits together the same RF training signals TRS as those in the processing step 4-4-1. This pair of RF training signals (p4) TRS are affected by IQ imbalance in the transmission part TR, and then received by the reception part REC via the feedback path FB.

The oscillation frequency FC3 of the local oscillator LO2 in the reception part REC is set to a frequency shifted from the center frequency Fc by a given amount so that frequency conversion in the quadrature demodulation unit QDEM causes the pair of IF training signals TRS to switch places with each other on the frequency axis, and positions the center of one of the folded back signals at the frequency f0 (f0=B/4). The control part CONT controls the local oscillator LO2 in advance to give the oscillation frequency FC3 a relation expressed as FC3=Fc+⅝×B+B/⁸⁄₂. The signal arrangement of the folded back IF training signals TRS is illustrated in FIG. 26(C).

This way, as in the processing step 1-2, one of the two blocks of IF training signals (p4) TRS (USB training signal TRS of FIG. 26(A)) falls within the pass band L of the reception low pass filters LPF and the other (LSB training signal TRS of FIG. 26(A)) is cut off by the reception low pass filters LPF as illustrated in FIG. 26C. The IF training signal (USB) TRS output from the associated reception low pass filter LPF is sampled by IF sampling in the Q channel side A/D converter ADC to be digitized. Subsequently, the same processing as the above-mentioned processing step 4-4-1 is executed.

[Processing Step 4-4-3]

Next, the correction coefficient calculation unit 45 combines data stored in the waveform memory 44 in the processing steps 4-4-1 and 4-4-2, and then calculates IQ imbalance correction coefficients and the in-band deviation of the one pair of training signals (p4) TRS.

The correction coefficients calculated in the processing steps 4-1-1 to 4-4-3 are each for a different frequency range. Therefore, the correction coefficient calculation unit 45 in the digital area adds those correction coefficients together to obtain a correction coefficient for the entire frequency range. The calculated transmission correction coefficient is used to correct the IQ imbalance of the transmission part TR.

Here, the center frequency of every block constituting the block pairs p1, p2, p3, and p4 of training signals TRS is the same at f0+B/16. Accordingly, even if the quadrature demodulation unit QDEM has in-band phase deviation and in-band amplitude deviation, the deviations are ignorable when compared in the baseband. This property is utilized to standardize signals that are obtained in the processing steps 4-2-1 to 4-4-3 with signals that are obtained in the processing steps 4-1-1 to 4-1-3. Frequency characteristics that ignore the frequency characteristics of the quadrature demodulation unit QDEM, namely, frequency characteristics in the RF system, can thus be examined. The frequency resolution of the frequency characteristics is determined by the number of pairs into which training signals TRS are divided.

As has been described, according to the fourth IQ imbalance correction processing, in which the reception side quadrature demodulation unit QDEM always gives IF training signals TRS the same center frequency f0, relative frequency characteristics in a section of the direct quadrature modulation/demodulation device 10 from the transmission side analog circuit area up to the reception side quadrature demodulation unit QDEM can be obtained while ignoring the frequency characteristics of the reception side quadrature demodulation unit QDEM.

[Direct Quadrature Modulation/Demodulation Devices of Modification Examples]

First Modification Example

In the direct quadrature modulation/demodulation device 10 of the embodiment described above, the feedback path FB including the feedback switch FB-SW is provided in order to correct IQ imbalance, and RF band training signals TRS are transmitted from the transmission part TR to the reception part REC via the feedback path FB. In a first modification example, on the other hand, IQ imbalance can be corrected without providing the separate feedback switch FB-SW, which invites an increase in hardware scale.

In place of the feedback switch FB-SW, the following method is used to feed back RF training signals TRS. That is, the feedback path FB is formed by utilizing the leakage of a transmission signal from the transmission part TR to the reception part REC, the amount of which varies depending on the isolation characteristics of the transmission/reception switching switch T/R-SW of the transmission/reception antenna AT. The transmission/reception switching switch T/R-SW may be a circulator.

When training signals TRS are transmitted from the transmission part TR to the reception part REC, the switch T/R-SW under control of the control part CONT is switched to a loaded state, namely, a configuration that allows a resistor or the like to absorb transmission power instead of executing transmission or reception. The power amplifier PA and the low noise amplifier LNA are also turned on simultaneously under control of the control part CONT.

The control part CONT controls the gain of the power amplifier PA to keep the leakage to a level that does not saturate the low noise amplifier LNA. To give a more detailed description, when training signals TRS are transmitted, the control part CONT controls the power amplifier PA to lower the output power. The output power is lowered to a degree that avoids reaching the saturation input level of the low noise amplifier LNA while taking into account attenuation in the switch T/R-SW and other components. The control part CONT further controls the gain of the low noise amplifier LNA to avoid reaching the saturation output level of the low noise amplifier LNA or the saturation input level of a downstream circuit.

Specifically, the gain of the power amplifier PA is lowered to a degree that sets the transmission power to, for example, approximately −20 dBm. The gain of the low noise amplifier LNA is lowered to a degree that does not change noise factor (NF) significantly, which is, for example, about +20 dB. When the control part CONT controls in this manner and the isolation loss of the switch T/R-SW is 20 dB, the reception power amplified by the low noise amplifier LNA is about −20 dBm.

The control part CONT also changes a local frequency Fc+Fcont of the reception part REC, and connects the digital quadrature demodulation unit DDEM between the quadrature modulation unit QDEM and the digital demodulation unit BDEM. RF training signals TRS are then transmitted and IQ imbalance is corrected in the manner described in the embodiment.

Second Modification Example

The description given above on the direct quadrature modulation/demodulation device 10 of the embodiment deals with OFDM by multicarrier modulation/demodulation. The same method as that of the direct quadrature modulation/demodulation device 10 is applicable to a direct quadrature modulation/demodulation device 10A, which employs single carrier modulation/demodulation, as long as the direct quadrature modulation/demodulation device 10A performs frequency domain equalization (FDE).

In OFDM, a k-th subcarrier has a relation expressed by Expression (1) between a transmission signal vector $s_k$ and a reception signal vector $y_k$ (for details, see Non-patent document 1).

$$y_k = \int F_k H_k F_k^{-1} s_k dt + n_k \qquad \text{Expression (1)}$$

where $F_k$ represents a Fourier quadrature function matrix, and $H_k$ represents a channel matrix in the k-th subcarrier.

In transmission by single carrier modulation with frequency domain equalization (SC-FDE), a frequency response that corresponds to the k-th subcarrier in OFDM is expressed by Expression (2).

$$y_k = \int F_k H_k \tilde{s}_k dt + n_k \qquad \text{Expression (2)}$$

Therefore, a preparation is made by turning a training signal s on the frequency axis into a training signal $s_0 \sim$ ($s_0$ tilde) in SC-FDE transmission which is expressed by Expression (3).

$$\tilde{s}_0 = \int F(f) s_0(f) df \qquad \text{Expression (3)}$$

The training signal actually takes a discrete value, and therefore a calculation of Expression (4) is performed for each subcarrier.

$$\tilde{s}_0 = \sum_k F_k s_{0,k} \qquad \text{Expression (4)}$$

As described above, the direct quadrature modulation/demodulation device 10A which employs single carrier modulation but performs frequency domain equalization is capable of calculating correction coefficients as when OFDM is employed. However, the direct quadrature modulation/demodulation device 10A needs some adaptations in correcting IQ imbalance with the correction coefficients. When a correction coefficient vector is given as c, signal correction for OFDM signals is expressed by Expression (5).

$$s' = c^t s \qquad \text{Expression (5)}$$

Therefore, in the case of single carrier modulation, a Fourier transform (FFT or DFT) operation and an inverse Fourier transform (IFFT or IDFT) operation as in Expression (6) are performed in the digital modulation unit BMOD of the transmission function part 20. Alternatively, a filter that has a tap coefficient expressed by Expression (7) may be prepared to perform a convolution operation of Expression (8).

$$\tilde{s}' = \int F^{-1} c^t F \tilde{s} df \qquad \text{Expression (6)}$$

$$\tilde{c} = \int F^{-1} c^t F df \qquad \text{Expression (7)}$$

$$\tilde{s}' = \tilde{c} \otimes \tilde{s} \qquad \text{Expression (8)}$$

Cyclic prefix (CP) is first and foremost a technology for suppressing multipath interference, and the technology of the second modification example is applicable to a direct quadrature modulation/demodulation device that does not execute CP addition processing and CP removal processing, as long as the device performs frequency domain equalization such as single-carrier frequency division multiplexing (SC-FDM).

Figure 28:
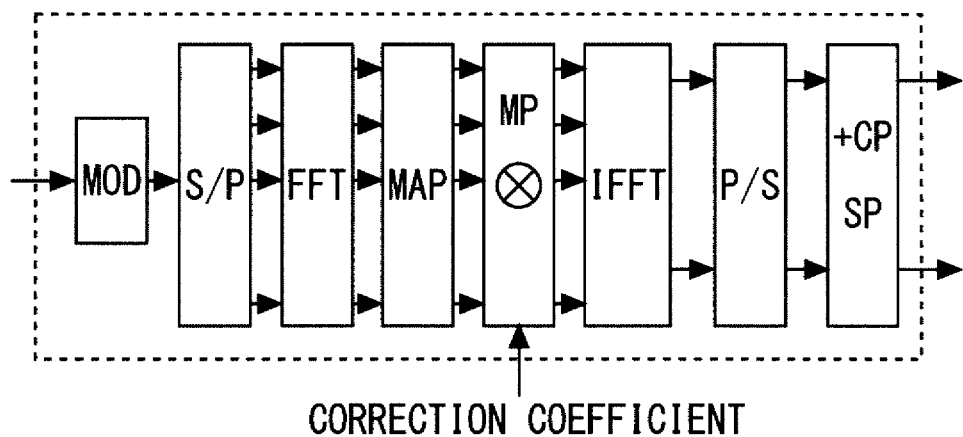
FIG. 28 is a block diagram illustrating a detailed configuration of a digital modulation unit in a direct quadrature modulation/demodulation device according to a second modification example.
Figure 29:
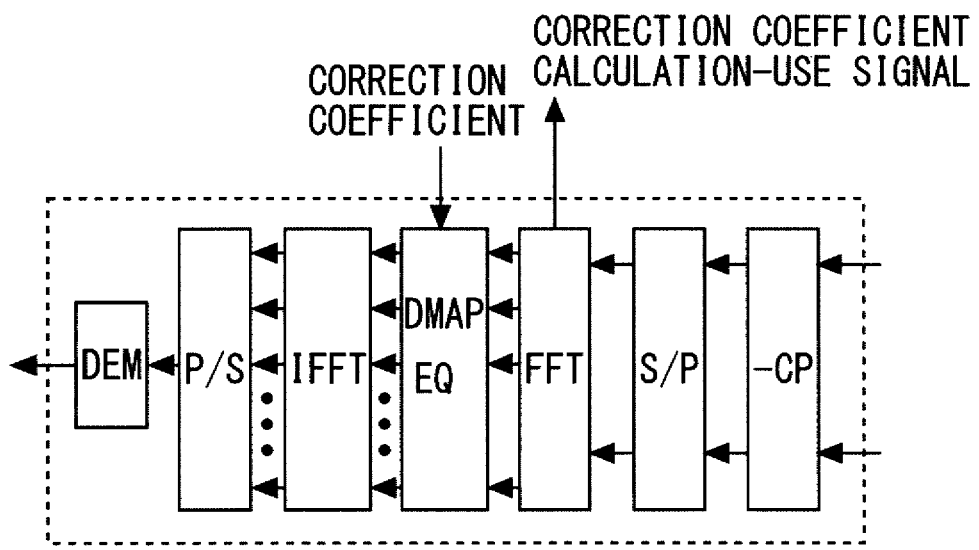
FIG. 29 is a block diagram illustrating a detailed configuration of a digital demodulation unit in the direct quadrature modulation/demodulation device according to the second modification example.

When realizing the direct quadrature modulation/demodulation device 10A according to the second modification example, the digital modulation unit BMOD of the transmission function part 20 and the digital demodulation unit BDEM of the reception function part 30 can be configured as illustrated in FIG. 28 and FIG. 29, respectively. The rest of the components including the quadrature modulation unit QMOD of the transmission function part 20, the quadrature demodulation unit QDEM of the reception function part 30, and the correction function part 40 have the same configurations as those in the direct quadrature modulation/demodulation device 10 of the embodiment.

In the direct quadrature modulation/demodulation device 10A of the second modification example, the digital modulation unit BMOD includes, as illustrated in the detailed configuration example of FIG. 28, a modulator MOD, a serial/parallel converter S/P, a Fourier transformer FFT, a mapping circuit MAP, a multiplier MP, an inverse Fourier transformer IFFT, a parallel/serial converter P/S, a waveform shaping circuit SP, and a cyclic prefix adding circuit +CP.

In the digital modulation unit BMOD that employs single carrier modulation with frequency domain equalization, transmission signals input in series are put through single carrier modulation and, further, serial/parallel conversion. The transmission signals are then converted back to frequency domain signals from time domain signals through a Fourier transform (FFT or DFT) operation, and mapped on the frequency axis. The transmission signals are then multiplied by correction coefficients (transmission correction coefficients) on a frequency basis, and turned back to signals on the time axis (complex digital BB signals) through an inverse Fourier transform (IFFT or IDFT) operation. The transmission signals further undergo parallel/serial conversion, and have cyclic prefixes attached and waveform shaped, before sent out.

The digital demodulation unit BDEM includes, as illustrated in the detailed configuration example of FIG. 29, a demodulator DEM, a parallel/serial converter P/S, an inverse Fourier transformer IFFT, a de-mapping circuit DMAP, a frequency domain equalizer EQ, a Fourier transformer FFT, a serial/parallel converter S/P, and a cyclic prefix removing circuit −CP.

In the digital demodulation unit BDEM, cyclic prefixes (CPs) are removed from input reception signals (complex digital BB signals), and a Fourier transform operation is performed to turn the time domain signals back to frequency domain signals. The frequency domain signals obtained by the Fourier transform are stored as correction coefficient calculation-use signals in the waveform memory, and also input to the de-mapping circuit DMAP and the frequency domain equalizer EQ. When there are correction coefficients (reception correction coefficients), a correction is made at the time of de-mapping and frequency domain equalization.

The corrected reception signals are turned back to signals on the time axis (BB signals) through an inverse Fourier transform operation and put through parallel/serial conversion, and undergo single carrier demodulation before sent out.

[Effect]

According to the IQ imbalance correction method disclosed herein, IQ imbalance can be reduced in both the transmission part and the reception part while maintaining the original hardware scale.

Other Modification Examples

The processing of the embodiment and modification examples described above is provided as a program that can be run on computers, on a recording medium such as a CD-ROM or a flexible disk, or via a communication line.

Some or all of the processing steps of the embodiment and modification examples described above can be selected at discretion to be executed in combination.

What is claimed is:

1. An IQ imbalance correction method, which is executed in a wireless communication device comprising a quadrature modulator and a quadrature demodulator in an analog circuit area, comprising:
   transmitting a plurality of pairs of radio frequency, RF training signals in separate transmissions by pairing RF training signals symmetric with respect to a center frequency on a frequency axis;
   controlling a reception local frequency of the quadrature demodulator in the analog circuit area to change to a frequency that is used to receive in the quadrature demodulator in the analog circuit area, via an internal path, each of the plurality of pairs of RF training signals transmitted in the separate transmissions, and to convert each of the plurality of pairs of RF training signals into intermediate frequency, IF training signals;
   performing analog/digital conversion on the IF training signals by an analog/digital converter and then performing quadrature demodulation on the IF training signals, which have been analog/digital converted, in a quadrature demodulator in a digital circuit area to generate baseband, BB training signals;
   calculating transmission correction coefficients for correcting IQ imbalance of a transmitter, which includes the quadrature modulator, based on signals obtained from demodulating the BB training signals using a demodulator in the digital circuit area;
   correcting the IQ imbalance of the transmitter using a transmission correction coefficient, which added the calculated transmission correction coefficients together, for an entire frequency range;
   transmitting the plurality of pairs of RF training signals at once for correcting IQ imbalance of a receiver, which includes the quadrature demodulator in the analog circuit area, after correcting the IQ imbalance of the transmitter;
   controlling the reception local frequency to change to the same frequency as a transmission local frequency, and demodulating the plurality of pairs of RF training signals that have been transmitted at once into BB training signals by direct quadrature demodulation in the quadrature demodulator in the analog circuit area;
   calculating reception correction coefficients for correcting the IQ imbalance of the receiver based on signals obtained from analog/digital conversion of the BB training signals performed using analog/digital converters and subsequent demodulation of the analog/digital converted BB training signals using the demodulator in the digital circuit area; and
   correcting the IQ imbalance of the receiver using the reception correction coefficients.

2. The IQ imbalance correction method according to claim 1, wherein:
   at least one specific pair out of the plurality of pairs of RF training signals is transmitted twice; and
   the reception local frequency is controlled to change to a first frequency (FR1) and to a second frequency (FR2) in order to convert both a lower side band (LSB) RF training signal and an upper side band (USB) RF training signal that form the at least one specific pair into the IF training signals; and
   wherein the second frequency (FR2) is greater than the first frequency (FR1).

3. The IQ imbalance correction method according to claim 1, wherein the performing comprises performing the analog/digital conversion on the IF training signals by the analog/digital converter on an I channel or a Q channel.

4. The IQ imbalance correction method according to claim 1, wherein:
   the reception local frequency is controlled to change in a manner that keeps a center frequency constant among a plurality of pairs of IF training signals converted from the plurality of pairs of RF training signals; and
   the calculating the transmission correction coefficients comprises obtaining at least one of amplitude deviation and phase deviation as deviation with regard to the plurality of pairs of IF training signals, and calculating the correction coefficients based on the obtained deviation.

5. The IQ imbalance correction method according to claim 1, wherein the internal path is formed by utilizing a signal leakage from the transmitter to the receiver, an amount of which varies depending on isolation characteristics of a transmission and reception switch of a transmission and reception antenna.

6. The IQ imbalance correction method according to claim 5, wherein the internal path is formed by setting the transmission and reception switch of the transmission and reception antenna to a loaded state in which transmission power is absorbed, turning on both a transmission amplifier and a reception amplifier, and controlling gain of the transmission amplifier in a manner that keeps the signal leakage to a level that avoids saturation of the reception amplifier.

7. The IQ imbalance correction method according to claim 1, wherein the internal path is a feedback path that includes a feedback switch.

8. The IQ imbalance correction method according to claim 1, wherein the plurality of pairs of RF training signals are orthogonal frequency division multiplexing (OFDM) signals obtained through multicarrier modulation.

9. The IQ imbalance correction method according to claim 1, wherein the plurality of pairs of RF training signals are signals obtained through single-carrier modulation with frequency domain equalization (SC-FDE).

10. The IQ imbalance correction method according to claim 1, wherein the plurality of pairs of RF training signals include at least two pairs of RF training signals.

11. The IQ imbalance correction method according to claim 1, wherein the plurality of pairs of RF training signals transmitted in the separate transmissions use equal bands or unequal bands on the frequency axis.

12. The IQ imbalance correction method according to claim 1, wherein the quadrature modulator in the analog circuit area is a direct quadrature modulator.

* * * * *